United States Patent
Firestone et al.

(10) Patent No.: US 10,182,671 B2
(45) Date of Patent: Jan. 22, 2019

(54) MANIKIN STRETCH JOINT

(71) Applicant: NOA Brands America, Inc., Broomfield, CO (US)

(72) Inventors: Kirk Firestone, Golden, CO (US); Scott L. Amman, Thornton, CO (US); Richard Varner, Longmont, CO (US); Derek Johnson, Golden, CO (US)

(73) Assignee: NOA BRANDS AMERICA, INC., Broomfield, CO (US)

( * ) Notice: Subject to any disclaimer, the term of this patent is extended or adjusted under 35 U.S.C. 154(b) by 392 days.

(21) Appl. No.: 15/191,922

(22) Filed: Jun. 24, 2016

(65) Prior Publication Data
US 2016/0302594 A1 Oct. 20, 2016

Related U.S. Application Data

(62) Division of application No. 13/917,140, filed on Jun. 13, 2013, now Pat. No. 9,398,820.
(Continued)

(51) Int. Cl.
*A47F 8/00* (2006.01)
*F16C 11/10* (2006.01)
*F16C 11/12* (2006.01)

(52) U.S. Cl.
CPC ............ *A47F 8/00* (2013.01); *F16C 11/12* (2013.01); *F16C 11/10* (2013.01);
(Continued)

(58) Field of Classification Search
CPC .. A47F 8/00; F16C 11/10; F16C 11/12; F16C 2314/70; Y10T 29/49826;
(Continued)

(56) References Cited

U.S. PATENT DOCUMENTS

| 1,384,826 A | 7/1921 | Cheevers |
| 1,387,097 A | 8/1921 | Benton |

(Continued)

FOREIGN PATENT DOCUMENTS

| CN | 201076 0094 | 3/2011 |
| EP | 1092457 A2 | 4/2001 |

(Continued)

OTHER PUBLICATIONS

JL. Throne & J. Gianchandani; "Reactive Rotational Molding"; Polymer Engineer and Science; Mid-Sep. 1980; 21 pages.
(Continued)

*Primary Examiner* — Bayan Salone
(74) *Attorney, Agent, or Firm* — Baker & Hostetler LLP

(57) ABSTRACT

Joints are provided for connecting first and second manikin parts. The joints can be partially opened like a clamshell by pivoting the parts on a point on the joint interface. They include first and second joint assemblies attached to the first and second manikin parts respectively. The joint assemblies comprise a stretch element such as a spring or an elastomeric cord, and are capable of detachably engaging with each other. The joints can rotate in a primary rotational direction, for example to move a detachable manikin leg close to the other manikin leg so that the manikin can quickly and easily be dressed in a pair of slacks. Rotation in a secondary direction is also provided to enable the manikins to be easily assembled by customers so that the manikin parts can be shipped separately. Components and methods of making and using the joints are also provided.

5 Claims, 15 Drawing Sheets

Related U.S. Application Data

(60) Provisional application No. 61/659,396, filed on Jun. 13, 2012.

(52) U.S. Cl.
CPC ....... *F16C 2314/70* (2013.01); *Y10T 29/4995* (2015.01); *Y10T 29/49826* (2015.01); *Y10T 29/49948* (2015.01); *Y10T 403/1616* (2015.01); *Y10T 403/1624* (2015.01); *Y10T 403/32057* (2015.01); *Y10T 403/7005* (2015.01); *Y10T 403/75* (2015.01); *Y10T 403/76* (2015.01)

(58) Field of Classification Search
CPC ....... Y10T 403/32057; Y10T 403/1616; Y10T 403/1624; Y10T 403/7005; Y10T 403/75; Y10T 403/76; Y10T 29/49948; Y10T 29/4995
USPC ....... 403/13, 14, 59, 348, 408.1, 409.1, 376; 29/525.02, 525.03
See application file for complete search history.

(56) References Cited

U.S. PATENT DOCUMENTS

| | | |
|---|---|---|
| 2,904,930 A | 9/1959 | Baggott et al. |
| 2,934,858 A | 5/1960 | Weih |
| 3,168,227 A | 2/1965 | Osmond |
| 3,246,422 A | 4/1966 | Teagarden |
| 3,277,602 A | 10/1966 | Speers |
| 3,634,966 A | 1/1972 | Ostrander |
| 3,713,252 A | 1/1973 | Bear |
| 3,757,458 A | 9/1973 | Thorn |
| 3,875,275 A | 4/1975 | Lemelson |
| 4,026,041 A | 5/1977 | Kennedy |
| 4,132,840 A | 1/1979 | Hugl et al. |
| 4,146,565 A | 3/1979 | Quraishi |
| 4,183,883 A | 1/1980 | Blair |
| 4,230,876 A | 10/1980 | Scholl et al. |
| 4,236,016 A | 11/1980 | Scholl et al. |
| 4,339,592 A | 7/1982 | Becker et al. |
| 4,619,540 A | 10/1986 | Day et al. |
| 4,624,818 A | 11/1986 | Black et al. |
| 4,775,558 A | 10/1988 | Haas et al. |
| 4,784,814 A | 11/1988 | Diethelm et al. |
| 4,954,005 A | 9/1990 | Knasel et al. |
| 4,956,133 A | 9/1990 | Payne |
| 4,970,045 A | 11/1990 | Steinberg et al. |
| 5,053,274 A | 10/1991 | Jonas |
| 5,098,213 A | 3/1992 | Day |
| 5,158,727 A | 10/1992 | Coleman-Kammula et al. |
| 5,223,193 A | 6/1993 | Bianchin et al. |
| 5,315,336 A | 5/1994 | Suzuka et al. |
| 5,468,432 A | 11/1995 | Hurley et al. |
| 5,538,786 A | 7/1996 | Hurley et al. |
| 5,582,670 A | 12/1996 | Andersen et al. |
| 5,693,696 A | 12/1997 | Garrett et al. |
| 5,783,611 A | 7/1998 | Strebel |
| 5,803,004 A | 9/1998 | Swann et al. |
| 5,830,392 A | 11/1998 | Strebel |
| 5,864,978 A | 2/1999 | McRary et al. |
| 5,869,546 A | 2/1999 | Gruss et al. |
| 5,872,182 A | 2/1999 | Duan et al. |
| 6,024,261 A | 2/2000 | Tseng |
| 6,129,476 A | 10/2000 | Berman et al. |
| 6,203,396 B1 | 3/2001 | Asmussen et al. |
| 6,257,467 B1 | 7/2001 | Chen |
| 6,439,952 B1 | 8/2002 | Yamamura |
| 6,485,215 B1 | 11/2002 | Chiang |
| 6,537,131 B1 | 3/2003 | Larian |
| 6,575,441 B2 | 6/2003 | Lefebvre |
| 6,619,875 B2 | 9/2003 | Chiang |
| 6,659,315 B2 | 12/2003 | Talaric et al. |
| 6,705,794 B2 | 3/2004 | Varner et al. |
| 6,932,669 B2 | 8/2005 | Lee et al. |
| 7,234,887 B2 * | 6/2007 | Chiang .............. A47F 8/00 29/428 |
| 7,325,996 B2 | 2/2008 | Varner et al. |
| 2003/0006526 A1 | 1/2003 | Talaric et al. |
| 2008/0296321 A1 | 12/2008 | Polins et al. |
| 2011/0024031 A1 | 2/2011 | Varner et al. |
| 2011/0027767 A1 | 2/2011 | Divinagracia |
| 2011/0097969 A1 | 4/2011 | DeFelice et al. |

FOREIGN PATENT DOCUMENTS

| | | |
|---|---|---|
| GB | 1442036 A | 7/1976 |
| JP | 2005-052393 A | 3/2005 |
| JP | 2009-233287 A | 10/2009 |
| JP | 4868337 B2 | 2/2012 |
| WO | WO 2012/015290 A2 | 2/2012 |

OTHER PUBLICATIONS

R.C. Progelhof & James L. Throne; "Parametric Concepts in Liquid Rotational Molding"; Polymer Engineering and Science; Oct. 1976; 7 pages.

J. L. Throne, J. Gianchandani & R.C. Progelhof; "Free Surface Reactive Fluid Flow Phenomena Within a Rotating Horizontal Cylinder"; 2$^{nd}$ World Congress of Chemical Engineering; 1981; 14 pages.

* cited by examiner

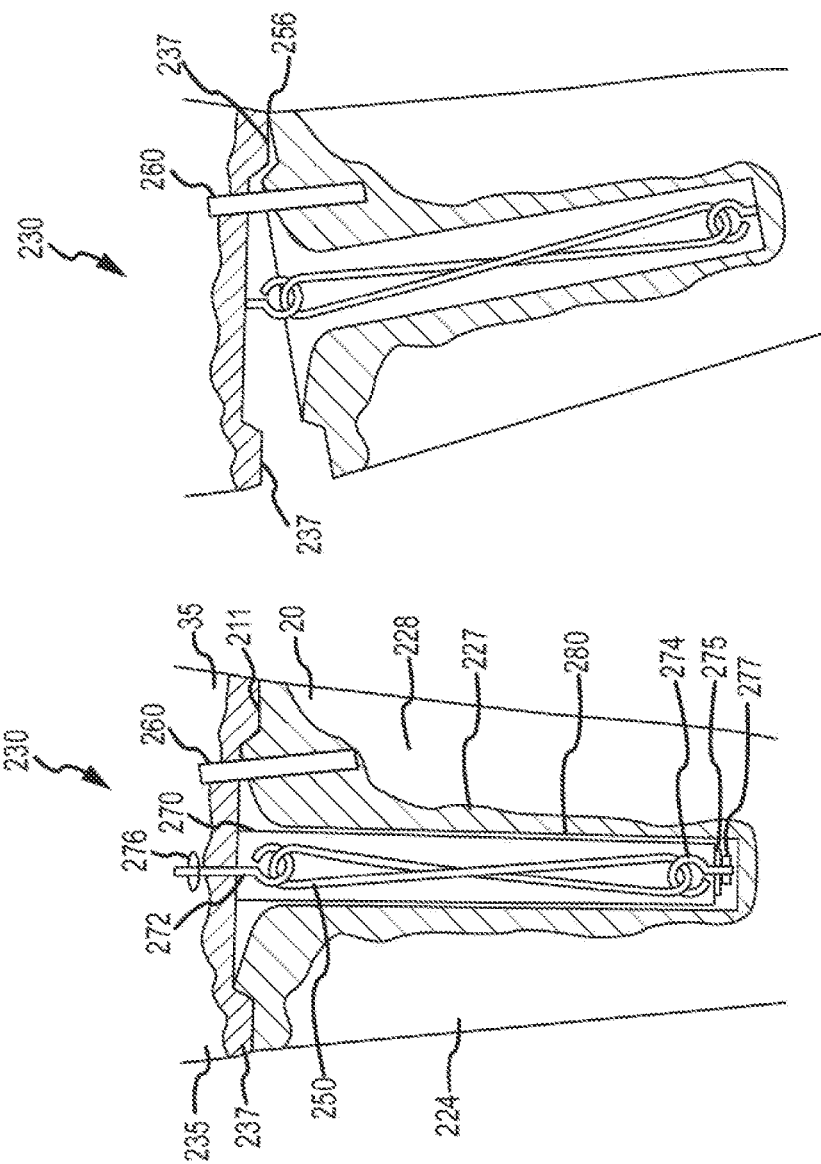

MANIKIN STRETCH JOINT

CROSS-REFERENCE TO RELATED APPLICATIONS

This application is a divisional of U.S. patent application Ser. No. 13/917,140 filed on Jun. 13, 2013, hereby incorporated by reference, which claims priority to U.S. Provisional Patent Application No. 61/659,396 filed Jun. 13, 2012, which is incorporated herein by reference to the extent not inconsistent herewith for purposes of written description and enablement.

BACKGROUND

Applicants have discovered a commercial need for an improved manikin joint that allows dressing of the manikin more quickly than can be done using currently-available manikin joints. Applicants have also discovered a commercial need for manikin joints that can be used with small manikin parts to keep them from being knocked off the manikin and lost. There is also a need for efficient manufacturing procedures for manikins comprising such joints. The following disclosure provides such manikin joints and manufacturing procedures.

A number of manikin joints comprising springs have been described, e.g., in U.S. Pat. No. 4,619,540, 4,954,005, 5,098,213, 6,257,467, 6,575,441, 6,619,875, and 6,932,669, and 7,234,887, U.S. Patent Publication No. 20080296321, and PCT Publication No. WO 2012015290. Prior manikin joints have been unsatisfactory for the purpose of making it easy to dress manikins in trousers without detaching the leg from the body. For example, U.S. Pat. No. 7,234,887, allows a leg joint to partially open up only to an angle between the joint surfaces of about 15°, but this is insufficient to move the legs of most manikins close enough together that they can both be inserted into trousers.

AU patents and publications referred to herein are incorporated by reference to the extent not inconsistent herewith for purposes of written description and enablement.

SUMMARY

Disclosed herein is a manikin joint connected to first and second parts of a manikin body for allowing the second part to move relative to the first part. The joints hereof are designed so that after opening, they will automatically close when no opening force is being exerted on either part, and will close in such a way that they automatically seat together in the original closed position every time.

A detachable leg comprising a stretch joint hereof can be easily pulled toward the other leg in order to dress the manikin in a pair of pants, and therefore does not need to be detached and reattached for this purpose. In embodiments, the joint parts do not rotate with respect to each other in a direction parallel to the joint interface. In embodiments a locking key does not rotate out of a locked position with respect to the keyway in use, so that there is no worry that the joint will accidentally disengage after repeatedly being partially opened. In embodiments, the limb can be rotated in two directions, e.g., sideways and back and forth or up and do'.vn. In embodiments a limb can be attached in a desired position and will not rotate out of this position when the joint is partially opened and then closed, as the limb automatically repositions itself correctly when the joint is closed.

A manikin joint hereof is capable of connecting first and second manikin parts, and when said first and second parts are connected, capable of allowing said joint to be partially opened by pivoting the parts with respect to each other on a pivot point on the interface between the manikin parts. The manikin joint comprises: a first joint assembly attached to the first manikin part; a second joint assembly attached to the second manikin part, which is capable of detachably engaging with the first joint assembly. The second joint assembly comprises: a stretch element, which in use is attached to the first manikin part at a first attachment point on the stretch element and to the second manikin part at a second attachment point on the stretch element. In use the stretch element in use is capable of: being elongated in by applying a first stretching force to it at the second attachment point or at a point on the stretch element other than the first attachment point. The stretch element is also capable of automatically returning to a less elongated position in the absence of the stretching force being applied.

The joint also comprises a pivot element operationally connected to the stretch element, allowing said stretch element to pivot in a primary rotational direction wherein the manikin parts in use can pivot with respect to each other at a pivot point located at an interface between the first and second manikin parts into a partially-open position in which the joint interfaces can form an angle with respect to each other greater than about 15°, in embodiments, between about 20° and about 60°, such as 30° or more, 40° or more 45° or more, or 50° or more. Angles less than about 20° typically do not allow manikin legs to move close enough to each other to be easily dressed in pants without detaching the leg.

A rigid element extending between said manikin parts prevents them from sliding with respect to each other when said joint is in partially open position.

Manikins comprising the stretch joints hereof and components used in forming the manikin joint are also provided herein, as are methods of making and using the manikin joints.

BRIEF DESCRIPTION OF THE DRAWINGS

FIG. 13 is a cross-sectional front view of an elastomeric cord manikin stretch joint hereof inside the upper portion of a manikin leg in closed position.

FIG. 14 is a cross-sectional view of the manikin leg of FIG. 13 with the joint in partially open position.

DETAILED DESCRIPTION

Unless otherwise indicated herein, the following definitions are used herein:

the terms "upper," "lower," "top," "bottom," "horizontal," "vertical," "front," "back," "sideways," "frontward," "forward," "backward," "distal" and "proximal" are used herein to have the meaning of such terms relative to the reference object being referred to, e.g., a normal standing manikin shaped like a human figure. When these terms are used to refer to joint components and application of forces on joint components, the reference object is the stretch element such that "upward" and "downward" refer to the direction defined by the length of the stretch element.

Figure 3:
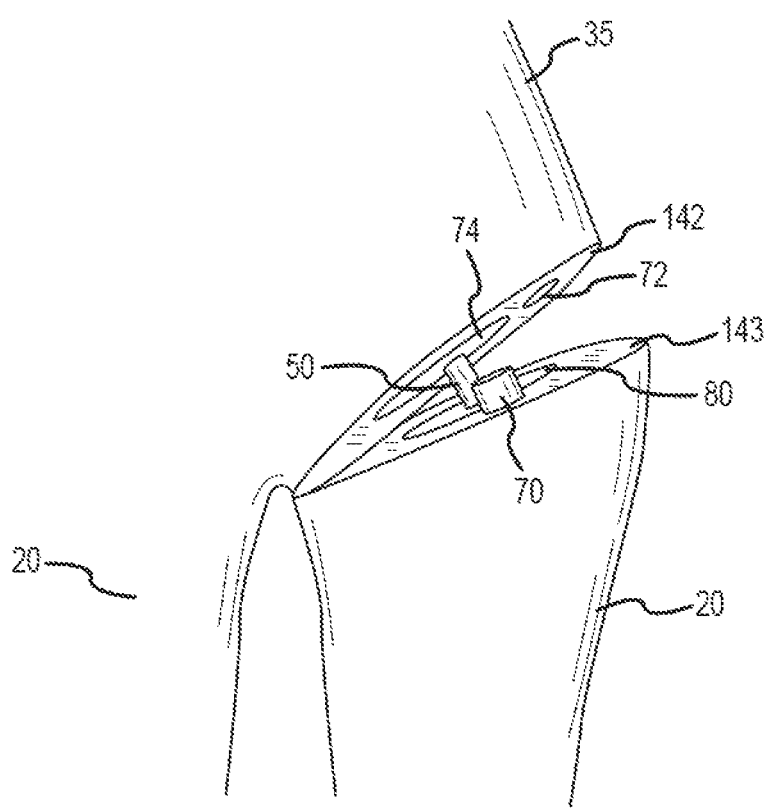
FIG. 3 is a front view of the female manikin of FIG. 1 with a compression spring stretch joint hereof depicting a detachable leg of a manikin being moved sideways toward the other leg in preparation for dressing the manikin such that a portion of the compression spring assembly of the leg joint is visible, along with the guide boss and body flangeboard recess. The leg is being rotated to bring its lower portion closer to the lower portion of the other leg for ease of dressing the manikin.
Figure 18:
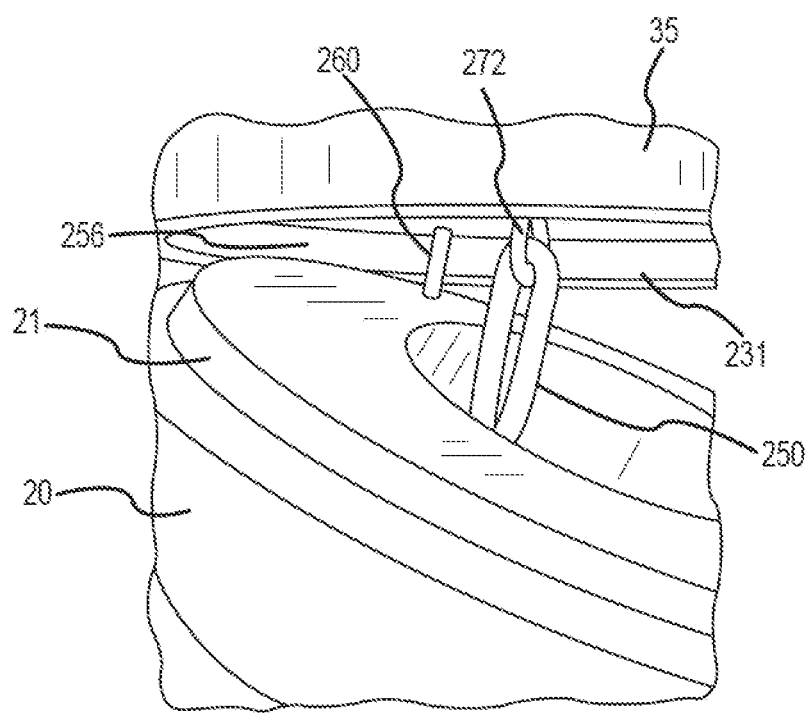
FIG. 18 shows a partially open elastomeric cord manikin joint with the elastomeric cord and pivot pin extending from the body into the leg.

As used herein, "partially opened" means opened without disengaging the stretch element from either part of the joint by tilting the joint parts with respect to each other like a clamshell, e.g., as shown in FIGS. 3, 14 and 18.

A "rotation-constraining element" is a component that in use is able to prevent rotation of the joint parts with respect to each other in a particular plane.

A "joint interface plane" is the plane defined by the outermost points of the surfaces of each joint interface.

When a first component hereof is described as "operationally connected" to a second component, this means the first component is directly attached to the second component or indirectly attached to the second component (e.g., via one or more other components that are directly connected to the second component) such that a change in the first component causes a change in the second component, e.g., such that a change in position of the second component is caused by a movement of the first component A "pivot point" as used herein can be a location on one manikin part upon which another manikin part pivots (rotates relative to the other manikin part). For example, manikin parts can pivot on each other at a pivot point located on the interfacing surfaces of each manikin part, without the need for a special pivot element; or the pivot point can be located in a hinge or pivot bar, such as the pivot key hereof, or other pivot element known to the art connected to the manikin parts on which the manikin parts rotate relative to each other.

References to "small" and "large" compression springs herein mean that the "small" compression spring is smaller than the "large" compression spring. The components hereof can be scaled up or down depending on the size of the manikin for which they are used.

The joint interface includes all the points where one of the manikin parts touches the other when the joint is closed. A plane defined by the three highest points is a joint interface plane.

Manikin joints are provided herein that are capable of connecting first and second manikin parts, and when the first and second parts are connected, are capable of allowing the joint to be partially opened by pivoting the parts with respect to each other on a pivot point.

When the first and second parts are connected, the manikin joints hereof are capable of being partially opened by pivoting the parts with respect to each other on a pivot point on the interface between the manikin parts.

A manikin joint hereof comprises: a first joint assembly attached to a first manikin part; and a second joint assembly attached to a second manikin part, the second joint assembly being capable of detachably engaging with the first joint assembly.

In embodiments, the interface between the manikin parts connected by the joint forms a line on the outside of the manikin that is without gaps and is difficult to notice, with any points of discontinuity of the joint interface near the outside of the manikin being small enough to minimize the visibility of the joint interface on the outer surface.

The manikin joint comprises a stretch element, which in use is attached to the first manikin part at a first attachment point on the stretch element and to the second manikin part at a second attachment point on the stretch element, wherein the stretch element in use is capable of being elongated by applying a first stretching force thereon at the second attachment point or at a point on the stretch element other than the first attachment point, and is capable of automatically returning to a less elongated position in the absence of application of the stretching force.

The stretch element has a compression strength sufficient to prevent wiggling of the second part during static use of the manikin, but not so strong that it prevents the joint from being operated by personnel of average strength without special tools. In an embodiment in which the first manikin part is a manikin body and the second manikin part is a manikin leg, the stretch element has a compression strength between about 35 and about 75 pounds, and in embodiments between about 45 and about 55 pounds, e.g., about 50 pounds. In an embodiment the stretch element is a spring; in another embodiment, the stretch element is an elastomeric cord such as a bungee cord.

The manikin joint also comprises a pivot element on the first manikin part or on the first joint assembly that is operationally connected to the stretch element, upon which the stretch element can pivot into a partially-open position in a primary rotational direction on a pivot point located at an interface between the first and second manikin parts. The pivot point can simply be a point on the surfaces of each joint part at the joint interface, or can be located in a pivot element such as a hinge, ball and socket, or other pivot mechanism known to the art.

The manikin joint also comprises a rigid element extending between the manikin parts that prevents them from sliding with respect to each other when the joint is in a partially open position. In an embodiment this is a rotation-constraining pivot pin that extends between the joint parts at the joint interface; in another embodiment, this rotation-constraining element is a specially-designed rigid keybody as described herein.

In an embodiment, the manikin joint also comprises a key and a keyway into which the key fits. The keyway is fixedly attached to one manikin part, e.g., is part of and fixedly attached to the first joint assembly, and the key is part of the other manikin part, e.g., is part of and fixedly or removably attached to the second joint assembly. The key is sized and shaped, in use, to be inserted through the keyway in an orientation in which it is aligned with the keyway, and after insertion to be rotatable to a second orientation in which it is not aligned with the keyway, such that the key cannot be withdrawn from the keyway unless it is rotated into alignment with the keyway. In an embodiment, the key is an elongated member having a narrowed middle section such that steps are formed between the middle portion and each end of the key.

In an embodiment, the second joint assembly comprises a slot, such as a substantially rectangular slot with curved ends, sized and shaped to receive a rigid keybody therethrough. In an embodiment the slot is slightly larger than the locating portion (the upper portion of the bottom section) of the keybody so as to inhibit rotation of the keybody in a horizontal plane (parallel to the bottom of the shoulder of the keybody that separates the upper section from the bottom section), and minimize the likelihood of the keybody hanging up in the slot as it rotates in the primary rotational direction. However, the slot should not be so much larger than the locating portion of the keybody as to interfere with seating of the keybody in the slot.

In embodiments, the interface between the manikin parts when the joint is closed forms a line on the outside of the manikin that is difficult to notice, with any points of discontinuity near the outside of the manikin being small enough to minimize the visibility of the joint interface on the outer surface of the manikin.

The manikin parts can be sized to correspond to appendages of a full-size human manikin, e.g., head, arms, shoulders, torso, trunk, pelvis, legs, hands, feet, fingers and toes. The manikin parts can also be sized corresponding to appendages of normal human children, e.g., age about 7 to about 12, or to babies. The manikin parts can also be parts of an animal, or can be imaginative and fantastical parts, such as advertising signs for placement on a manikin body where a head should be, or non-human parts on a human body, e.g., claws on human arms where a hand should be. Manikins containing the joints disclosed herein can also be incomplete replicas of human, animal or fantasy creatures, e.g., they can lack a head or arms or other parts. In an embodiment hereof the manikin joint connects a manikin body that consists of a chest and abdomen, and a manikin leg. In embodiments, manikins comprising the stretch joints hereof include one or more of the stretch joints described herein to connect one or both legs to a body, and/or one or both arms to a body, and/or one or both thumbs to their hands.

A keybody is also provided herein, which can be operationally connected to the stretch element The keybody comprises a top and bottom section, the top section overhanging the narrower bottom section to form a shoulder that is too large in at least one dimension to fit through the slot.

The top section of the keybody comprises: a recess formed in its top end; a small compression spring disposed within the recess; a set screw closing the top end of the recess, capable in use of exerting pressure on the small compression spring; portals in opposite walls of the recess sized and shaped to receive a key inserted lengthwise through the both portals and to allow the key to tilt up and down within said portals in a secondary rotational direction orthogonal to the primary rotational direction when a second force orthogonal to the first stretching force is applied to the stretch element. The portals extend in a vertical direction (relative to the length of the large compression spring) higher than the top of the key so that there is room for the key to tilt up and down within the portals. This provides a secondary rotation of the joint over a small arc sufficient to allow the pivot key to rise up enough to ride up the locating ramp during locking and unlocking of the joint assemblies when attaching and detaching the manikin parts. The small compression spring is held in place within the recess by the steps formed between the narrowed middle and end portions of the key. The small compression spring has a compression strength large enough to retain the leg in a static position, but not enough to prevent the leg from pivoting on the secondary axis. In embodiments, the large compression spring has a compression strength between about 35 and about 75 pounds, and in embodiments between about 45 and about 55 pounds, e.g., about 50 pounds.

The large compression spring has a length sufficient to allow partial opening of the joint to an angle between the joint interfaces greater than about 15°, in embodiments greater than about 20° and in embodiments greater than about 40°, in embodiments greater than about 50° and in embodiments up to about 60°, and short enough to maintain the proper connection between the joint parts in static position. The bottom section of the keybody with the retaining rod screwed into it is sized to provide a desired compression of the spring when the joint parts are in static position. The ratio of the large compression spring length to the retaining rod length is determined by the spring rate on the spring. The rod should be sufficiently shorter than the spring so as to cause the desired compression of the spring in the static position, e.g., about 50 pounds. The spring length is determined by the amount of desired stretch of the joint (about 20° up to about 60°), and in embodiments about 50° to about 60°. In an embodiment of a leg joint for a full-size manikin, the large compression spring can be about four inches long with a compression strength of about 50.5 pounds, and can be compressed to about three inches as installed in the joint assembly.

The bottom section of the keybody comprises a top portion, referred to herein as the "locating portion," and a bottom portion, referred to herein as the "stretch portion." The locating portion is sized and shaped so as to fit into the slot only when aligned with respect to the slot so as not to rotate in the slot in the plane defined by the bottom of the shoulder. The length of the slot is greater than required to receive the locating portion of the keybody. The locating portion of the keybody is tapered steeply downward (e.g., at an angle of about 8-12° from vertical) such that the keybody can tilt within the slot when a downward off-center force (push or pull) is applied to the bottom of the keybody. This allows the keybody and the second manikin part to rotate on a primary axis of rotation defined by the length of the key. However, when the locating portion of the keybody is within the slot, the second manikin part will not rotate horizontally in the plane defined by the bottom of the shoulder. In an embodiment the width of the slot is also greater than required to accommodate the slot In an embodiment, the dimension of the slot are enough greater than the locating portion of the of the slot to prevent the keybody from hanging up within the slot when rotating in the primary rotational direction such that the joint will open to an angle greater than about 15°, in embodiments from about 20° to about 60°, about 40° to 60° or about 50° to 60° and in embodiments about 60°. The dimensions of the slot, however, should not be so much greater than the dimensions of the locating portion of the keybody that proper seating of the keybody in the slot is prevented.

The locating portion of the keybody is tapered downward sufficiently to allow rotation of the joint in the primary rotational direction such that the joint will open to an angle greater than about 15°, in embodiments from about 20° or about 30° or about 40° or about 50° to about 60°, and in embodiments about 60°.

The bottom "stretch" portion of the bottom section of the keybody is tapered less steeply downward, e.g., at an angle of about 2° from vertical. The keybody is designed so that a downward force on the spring can cause slot to be completely pulled away from the locating portion of the keybody, allowing the keybody to rotate freely in the slot in a horizontal direction without dislodging the pivot key from its locked position.

The length of the spring is chosen to provide sufficient stretch that the joint can be partially opened to an angle greater than about 15°, in embodiments between about 20° and about 60°, in embodiments between about 40° or 50° and about 60°, and in embodiments between about 50° and about 60°. In embodiments the large compression spring is attached to the bottom of a keybody by means of a retaining bushing held in place by a retaining rod and nut, wherein the top of the retaining rod screws into a threaded recess in the bottom portion of the keybody. The length of the retaining rod and the stretch portion of the keybody are chosen to provide the desired compressibility and stretchability of the spring. In embodiments, the locating portion comprises about 40% of the length of the bottom section of the keybody and the stretch portion comprises about 60% of the length of the bottom section of the key body, while the top portion of the keybody comprises about 44% of the total length of the keybody. The length of the spring and retaining bolt are chosen so as to allow the joint to open to an angle greater than about 15°, in embodiments between about 20° or about 30° or about 40° or about 50° and about 60°. The keybody is designed so that the locating portion can move completely out of the slot in the key assembly plate, so that the upper part of the key body does not engage with the slot and interfere with opening of the joint to the desired angle.

Application of a force on the second joint part in a secondary rotational direction causes the key to tilt within the portals in the upper portion of the keybody and also causes the keybody to tilt within the slot, thereby causing the second manikin part to rotate with respect to the first manikin part in a second rotational direction orthogonal to the primary rotational direction around the elongated key. (The primary axis of rotation passes through the long dimension of the elongated key and the secondary axis of rotation passes through the center of the key along short dimension thereof.)

Manikins containing the manikin parts with joints described herein are also provided. In embodiments, the manikin parts correspond in size and shape to normal human body parts, from grown athletic men to small babies and children, e.g., children from about seven to about twelve years of age. Manikin bodies and parts can be formed of any material known to the art, and can be hollow with an outer shell, or substantially solid; however, sufficient space should be provided inside the manikin part so that the first and second joint assemblies fit therein. In addition in an embodiment comprising a pivot key, sufficient space should be provided into which the unattached end of the pivot key can extend to allow the pivot key to freely move within that manikin part when the joint is opened and closed, In embodiments, the manikins are hollow manikins as described in U.S. Pat. No. 6,705,794 and/or US Patent Publication No. 2011/0024031, incorporated herein by reference to the extent not inconsistent herewith for purpose of enablement and written description.

The manikin joints hereof can also comprise interfitting features on the first and second joint assemblies at the joint interface that are capable of mating when the first and second joint assemblies are positioned in a desired alignment Such interfitting features can be of any size and shape that does not interfere with operation of the joint, including a guide boss on one joint assembly or manikin part and a groove and/or a recess sized and shaped to receive the guide boss on the other joint assembly or manikin part. The joint hereof is capable in use of automatically positioning itself in the same position every time when the joint is allowed close so that, for example, the manikin foot will always come back to the desired position. In embodiments, the interfitting guide boss and mating groove and recess on the joint interfaces are pulled together and mated by the compressive force of the spring when the opening force applied to the open the joint is removed.

A method is also provided herein for attaching a second manikin part to a first manikin part using a manikin joint hereof to connect these parts. The method comprises: providing a first manikin part comprising the first joint assembly and a second manikin part comprising the second joint assembly; attaching the first manikin part to the second manikin part by: positioning the second manikin part with respect to the first manikin part such that the surfaces of their respective joint assemblies are substantially parallel, the guide boss is proximal to the end of the groove farthest away from the recess, and the pivot key is proximal to the keyway; moving the manikin parts toward each other such that the guide boss is received within the groove and the top of the keybody and the pivot key are received through the keyway; rotating the manikin parts with respect to each other until the guide boss reaches the end of the groove closest to the recess and the pivot key is no longer aligned with the keyway, whereby the joint assemblies are locked together; exerting downward force on the second manikin part to cause the guide boss to disengage from the groove; and continuing the rotation of the second manikin part with respect to the first manikin part until the guide boss mates with the recess and the large compression spring causes the manikin parts to be pulled together.

In use the pivot key does not rotate in the key slot when the joint is opened because it is constrained by the locating ramps.

When it is desired to detach the second manikin part from the first manikin part the following steps are performed: pulling the second manikin part away from the first manikin part by exerting a downward force on the second manikin part, thereby stretching the large compression spring and separating the manikin parts a sufficient distance to disengage the guide boss from the recess; rotating the second manikin part with respect to the first manikin part so as to bring the guide boss into alignment with the groove until the guide boss is proximal to the end of the groove closest to the recess; ceasing to exert the downward force thereby allowing the compressive force of the large compression spring to cause the guide boss to seat in the end of the groove; rotating the second manikin part until the guide boss reaches the end of the groove farthest from the recess, thereby aligning the pivot key with the keyway; and pulling the second manikin part away from the first manikin part, thereby pulling the key through the keyway and separating the second manikin part from the first manikin part.

The manikin joints hereof, when used to connect a manikin body comprising an integral leg to a detachable manikin leg, are especially useful for dressing the assembled manikin in a pair of pants. This is done by inserting the lower end of the integral leg onto or through a first leg of the pants without pulling the pants further up on the leg; exerting an inward pressure on a portion of the detachable leg, causing the stretch element to elongate and the leg to rotate with respect to the body on a pivot point at the joint interface between the body and the detachable leg near the manikin groin, thereby bringing the lower portion of the detachable leg closer to the lower portion of the integral leg; inserting the lower end of the detachable leg into or through a second leg of the pants; and pulling the pants up to cover both legs.

A method of making a manikin joint hereof is also provided, the method comprising: providing a first manikin part, a second manikin part, a stretch element, a pivot element and a rigid element capable of extending between the manikin parts; and attaching the stretch element to the first and second manikin parts such that movement of the parts with respect to each other will cause the stretch element to elongate; operably connecting the pivot element to the stretch element such that when a first stretching force is exerted on the stretch element, the second manikin part can pivot in a primary rotational direction with respect to the first manikin part on a pivot point located at the joint interface to bring the joint into a partially open position; and positioning the rigid element to extend between the manikin parts such that they are prevented from sliding with respect to each other when the joint is in a partially-open position.

The manikin joint comprising a large compression spring can be pulled to a partially open position by pivoting on a pivot point near the outside of the joint parts, opposite to the location of the pivot point when the detachable leg is rotated closer to the other leg. In addition, by adjusting the orientation of the joint assemblies with respect to each other in different configurations, the joint can be made to partially open in many different selected positions.

In embodiments hereof in which the stretch element is an elastomeric cord, the second manikin part can comprise: the stretch element attached thereto; and the first manikin part can comprise: an eye bolt attached thereto which serves as a pivot element upon which the stretch element can pivot; and a rigid rod attached to the first manikin part which in use extends through and is slidable in a hole in the second manikin part such that the manikin parts are prevented from sliding upon each other when the joint is partially opened.

In an embodiment hereof, a stretch joint for a manikin is provided that utilizes a variable length element such as a bungee cord connected at each end to a part of a manikin to be joined. The joint opens by pivoting on a pivot point located on the joint interface, typically on an edge of the joint interface. The joint can be opened by the user by exerting force on one of the manikin parts joined by the joint A pivot pin is positioned within the joint so as to prevent one part from rotating horizontally with respect to the other part and to ensure that once the opening force exerted on the manikin part is removed, the joint will automatically return to its initial position forming a joint interface substantially without gaps, and difficult to visually detect. The elastomeric joint enables a manikin to be dressed in about half the time required for dressing manikins with previously-known joints.

In an embodiment an elastomeric cord is attached to the first manikin part and passing through and intersecting the joint interface at a first point therein; the elastomeric cord also being attached to the second manikin part; a pivot point at an edge of the joint interface selected so as to allow movement of the second manikin part relative to the first manikin part in a desired direction when an operator opens the joint by exerting an opening force on the second manikin part; a pivot pin attached to the first manikin part such that it passes through and intersects with the joint interface at a second point on the interface defined by a line between the first point and the pivot point and extends through a hole in the shell of the second manikin part into a void space and is slidable in the hole when the joint opens and doses; wherein locating the pivot pin at the second point prevents rotation of the manikin parts relative to each other around an axis passing through the first point and orthogonal to the joint interface; and wherein the pivot pin serves to guide the second manikin part back to its original closed position when the opening force on the second manikin part is removed.

In an elastomeric cord embodiment, one joint part can have a raised portion or "plateau" and the other part can have a corresponding hollow at the joint interface. The edges of the plateau and hollow can be chamfered so that once the top of the plateau is pulled into a position anywhere within the area defined by the hollow, it will automatically become centered in the hollow when the joint is closed. The joints are also provided with a pivot pin to ensure that they do not rotate horizontally relative to each other when they are opened and closed, and that they do not become otherwise misaligned during use.

The elastomeric cord can be a bungee cord, a rubber cord, or cord made of any other stretchy material known to the art, so long as it possesses enough strength to keep the joint closed under normal use including being bumped, but not so much strength that it cannot be easily opened by retail store employees and others who are tasked with dressing manikins. Typically, a cord strength capable of exerting a pulling force of up to about 35 to about 75 pounds, in embodiments about 35 to about 45 pounds, and in embodiments about 35 to about 50 pounds, is useful for attaching full-size manikin limbs, e.g., legs, to bodies, is sufficient A cord with lesser strength can be used in joints connecting smaller manikin parts to other manikin parts. The elastomeric cord is under tension in the closed joint to keep it from falling open, e.g., the cord is prestretched to about 1.25 to about 1.5 or 2 times its unstretched length before attaching it to the manikin parts so that it exerts a constant pulling force on the joint parts to keep the joint closed. The same elastomeric cord can be used for both male and female embodiments using full-size manikin parts. Using this type of elastomeric cord, it typically requires about 6 to about 9 pounds of pull strength to move a leg from a wide-stance position such as that shown in FIG. 1 to within about eight inches of the other leg. In embodiments in which single elastomeric cord, e.g., a bungee cord, has insufficient strength to keep the joint closed under normal use, the cord can be doubled or tripled, or can additionally be configured to form a bridge between two sides of a loop formed by the cord as described herein, so as to provide the required pulling power for the joint. In an embodiment wherein a leg is connected to a body by the joint hereof, the elastomeric cord exerts a pulling force of about 37.5 pounds when the joint is closed and about 39.75 pounds when the joint is open. In embodiments, the elastomeric cord is replaced by another device capable of producing the required forces on the joint, such as a spring or a pneumatic tube.

The term "elastomeric cord" as used herein refers to any configuration of one or more elastomeric cords that can be used to connect the two manikin parts and provide the necessary strength, including a single cord, a looped cord, comprising an angled bridge between the sides of the loop, and/or sets of two or more separate single cords used in parallel. The pull strengths specified for commercially available elastomeric cords are considered to be accurate within about plus or minus 10%. In embodiments, a compression spring can substitute for the elastomeric cord.

In embodiments, the elastomeric cord passes through the joint interface at about the center thereof, i.e., about the center of a circular joint interface or for a non-circular joint interface, at about the center of a notional line extending across the joint interface in the direction of desired movement of the joint as it opens and closes and passing through the pivot point.

The pivot point for the manikin joint can be located at a point on the proximal edge of the joint interface closer to the vertical midline of the body such that the joint opens to move the leg toward the midline, or the pivot point can be located at a point closer to the distal edge of the joint interface farther from the vertical midline of the body such that the joint opens to move the leg away from the midline. For example, the pivot point is located on the proximal edge of the joint interface near the crotch if it is desired that the joint open outward, moving the leg toward the midline, and the pivot point is located on the distal edge of the joint interface (on the opposite side of the leg from the crotch) at its interface with the body if it is desired that the joint open inward, moving the leg away from the midline of the manikin body. The pivot point can be selected so that the joint simulates natural or desired movement of one part relative to the other. No hinge, ball and socket, or other device is required at the pivot point. The pivot pin and the elastomeric cord are placed in line with the pivot point so that the manikin parts are able to rotate on the pivot point without the need for such devices; however, such devices can be used in embodiments hereof if desired. In use the pivot pin extends through a hole in the shell of the second manikin part sized to accommodate it, and is able to move within a void space of the second manikin part as the manikin joint opens and closes, with its movement constrained only by the sides of the hole.

In embodiments, the manikin joint hereof comprises an elastomeric cord having one end connected to a first manikin part via an eye bolt attached to the cord and screwed into a nut fixedly attached to the first manikin part. The other end of the elastomeric cord is connected to a second manikin part by being contained within a cylinder and connected to the bottom of the cylinder, wherein the cylinder is fixedly attached to the second manikin part. An "end" of an elastomeric cord means the portion of the cord or cord configuration or set of parallel cords that is attached to a manikin part. The elastomeric cords hereof have two "ends," one attached to a first manikin part and the other attached to a second manikin part to form the manikin joint. The cylinder can be fixedly attached to the second manikin part by being adhesively attached to an attachment tube that is molded into the second manikin part.

An embodiment of a manikin joint component disclosed herein comprises an elastomeric cord disposed within and fixedly attached to the bottom of a cylinder. The cylinder is sized to fit within a portion of a manikin limb corresponding to an unjointed portion of a human limb, e.g., the cylinder can fit within the upper leg above the knee. In embodiments, the cylinder is sized to fit within a whole leg or portion thereof. The cylinder can also be sized to fit within jointed or unjointed portions of manikin limbs, such as upper or whole arms, or whole thumbs.

In an embodiment, a method of making a manikin joint hereof to connect first and second parts of a manikin, wherein the first and second parts form a joint interface, comprises the following steps: providing an attachment element for an elastomeric cord in a first manikin part, e.g., a threaded nut molded into position in the first manikin part; identifying a desired pivot point on an edge of the joint interface upon which to pivot the joint to an open position; providing an attachment element for a pivot pin in the first manikin part, such as a threaded nut positioned to receive the threaded end of the pivot point, or a threaded hole in the shell of the first manikin part which is drilled or created during molding. The attachment element for the pivot pin is positioned such that the distance between the pivot pin at the joint interface and the elastomeric cord at the joint interface is about 20 to 30% of the distance between the elastomeric cord at the joint interface and the pivot point; providing an elastomeric cord with a strength that allows the joint to be opened by exertion of a selected force thereon and to automatically close when the force is removed; stretching the elastomeric cord to about 1.25 to about 2 times its normal length, in embodiments about 1.25 to about 1.5 times its normal length; attaching each end of the elastomeric cord to its attachment element in the first and second manikin parts; and attaching the pivot pin to the first manikin part.

In embodiments, the method of making a manikin joint to connect first and second parts of a manikin, wherein the first and second parts form a joint interface, comprises: molding an attachment element for an elastomeric cord into a first manikin part; identifying a desired pivot point on the outside of the joint interface upon which to pivot the joint to an open position; molding an attachment element for a pivot pin into the first manikin part such that the distance between the pivot pin at the joint interface and the elastomeric cord at the joint interface is about 20 to 30% of the distance between the elastomeric cord at the joint interface and the pivot point; molding an attachment tube into the second manikin part; configuring an elastomeric cord to provide a strength that allows the joint to be opened by exertion of a selected force thereon and to automatically close when the force is removed; providing a tube sized to accommodate the elastomeric cord when it is stretched to a length about 1.25 to about 2 times its unstretched length; providing a tubular spacer having tube walls sized to correspond to the walls of the tube used to contain the elastomeric cord; positioning the spacer at an end of the tube with the spacer ends abutting the tube; attaching a traction element to a first end of the elastomer cord; inserting the traction element into the tube at the end opposite the spacer and pushing it and the attached elastomeric cord through the tube until the traction element emerges from the end of the spacer; securing the second end of the elastomeric cord to a cap; affixing the cap to the end of the tube opposite the spacer; stretching the elastomeric cord by causing a pulling force to be exerted on the elastomeric cord by the traction element; retaining the elastomeric cord in its stretched position by means of a retaining element attached to the first end of the elastomeric cord that prevents the cord from reverting to an unstretched position inside the tube; attaching the first end of the elastomeric cord to its attachment element in the first manikin part; attaching the pivot pin to its attachment element in the first manikin part; and attaching the tube to the attachment tube molded into the second manikin part.

The tubes can be made of any suitable material, including cardboard, plastic, metal, wood, or other materials known to the art having sufficient stiffness and strength to withstand the forces upon them in use. The protective and attachment tubes do not have to be made of the same material.

Also provided herein is a manikin joint comprising: a variable length element removably attached at one end to a first position on a first manikin part and at the other end to a second position on a second manikin part so as to form a joint between the parts having a joint interface between the manikin parts; wherein the variable length element is configured to exert a pulling force on both manikin parts sufficient to keep the joint closed with both parts touching; wherein the variable length element is capable of elongating sufficiently to cause one manikin part to pivot on a pivot point at an edge of the joint interface, thereby opening the joint, when a sufficient opening force is applied to the manikin part; and wherein the variable length element is capable of automatically exerting a force on the manikin parts causing them to return to their original closed position; and a pivot pin fixedly attached to one manikin part and intersecting the joint interface between the outer edge thereof and the variable length element.

Further disclosed herein is a method of dressing a manikin having a stretch manikin joint in an article of clothing, the method comprising: inserting a first manikin parts at least partially into the article of clothing; moving the first manikin part toward a second manikin part by exerting a force on the first manikin part sufficient to open the manikin joint; inserting at least a portion of the second manikin part into the article of clothing; allowing the manikin joint to close by ceasing to exert the force on the first manikin part; and if necessary, finishing dressing the manikin in the article of clothing by covering remaining portions of the manikin with the article of clothing.

In embodiments, the manikin joint connects a manikin shoulder and a manikin arm, and the pivot point is located at a point on a front edge of the joint interface such that the joint opens to move the arm backward, or is located on a point on a back edge of the joint interface such that the joint opens to move the arm forward.

The manikin joint can also connect a manikin hand and a thumb, and the pivot point is located at a point on the edge of the joint interface proximal to the hand such that the joint opens to move the thumb toward the hand.

In an embodiment hereof, the manikin shoulder joints are magnetic joints, e.g., as described in U.S. Pat. No. 6,705,794, incorporated herein by reference to the extent not inconsistent herewith for purposes of written description and enablement.

In the Figures hereof and the following description, like reference numbers refer to like parts throughout.

Figure 1:
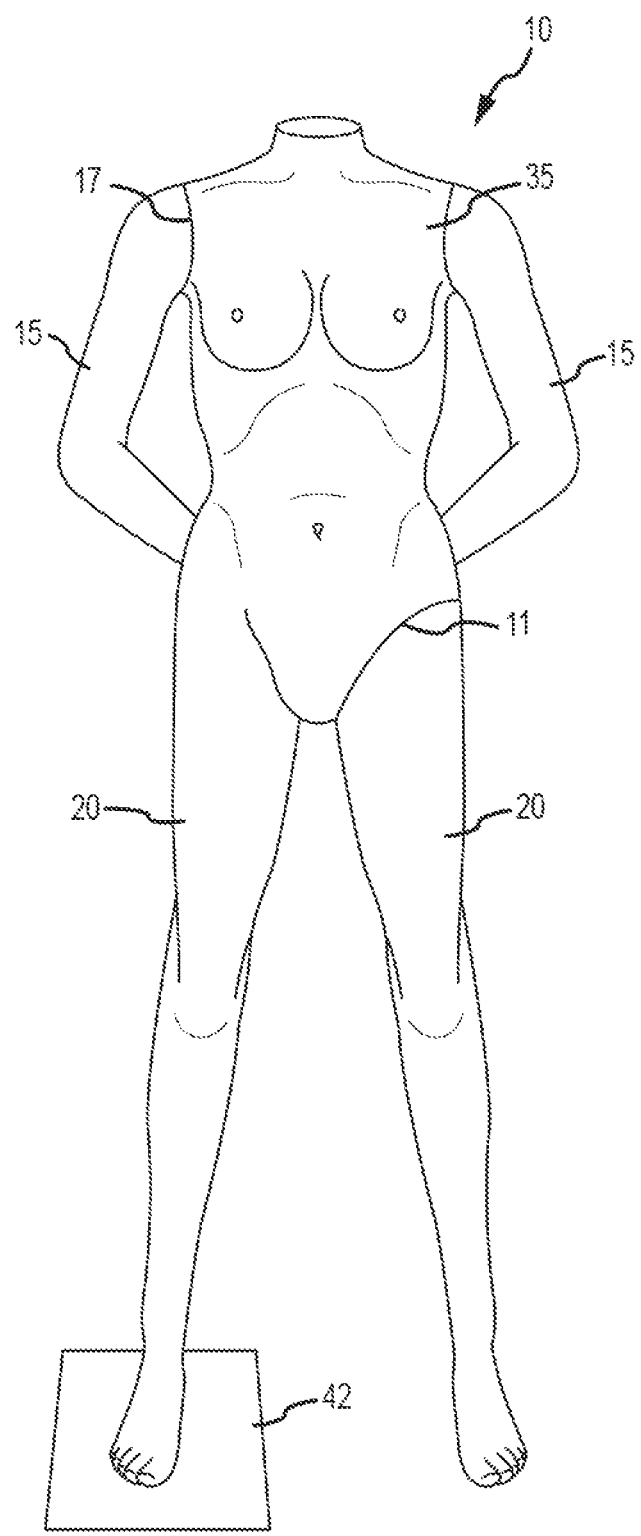
FIG. 1 is a front view of a full-size female manikin.

Referring to FIG. 1, arms 15 can be attached to body 35 by any manikin shoulder joint known to the art including the compression spring joint and elastomeric joint disclosed herein. Hands 25 can also be attached by any such joints, as can thumbs 26. It will be appreciated that the manikins hereof can be partial manikins lacking heads or other limbs, can be child-size or baby-size as well as full adult-size manikins, and can have all but one or more appendages integrally formed with body 35, or with the limb to which they are connected. For example, hands can be integrally formed with arms, and thumbs can be integrally formed with hands. The claims hereof encompass manikins having one or more limbs attached by the stretch joints disclosed herein.

In embodiments the manikin body and limbs are formed by molding with polyurethane.

In an embodiment illustrated in FIGS. 1-12, the manikin stretch joint hereof comprises a leg assembly including two compression springs, which assembly is operationally connected to the leg of a manikin. The manikin leg, in use, comprising the leg assembly, is connected to the body of the manikin by rotating the leg so that a pivot key on the leg assembly can pass through a keyway on a keyway assembly operably connected to the body of the manikin, then rotating the leg further so that the pivot key can no longer pass through the keyway, and so that a guide boss on the leg assembly engages with a recess on the leg assembly, preventing the leg from rotating with respect to the body. This forms a lock that prevents the leg from being detached from the torso. When the pivot key is engaged within the keyway the joint between the leg and the body can partially open so that the lower portion of the leg can be brought closer to the lower portion of the other leg of the manikin to make it easy to dress the manikin.

Both the key and keyway assemblies are attached to the first and second manikin parts by screwing them to flangeboards, such as injection-molded flangeboards that are molded into the manikin parts during the molding process. The flangeboards also serve to insure that the manikin parts attach in the proper orientation through the use of a boss pin and recess groove for attachment that culminates with a recess hole that houses the boss pin.

FIG. 1 is a front view of a full-size female manikin 10 comprising body 35, arms 15, legs 20, leg-body joint interface 11, am1-body joint interface 17, and stand base 42.

Figure 2:
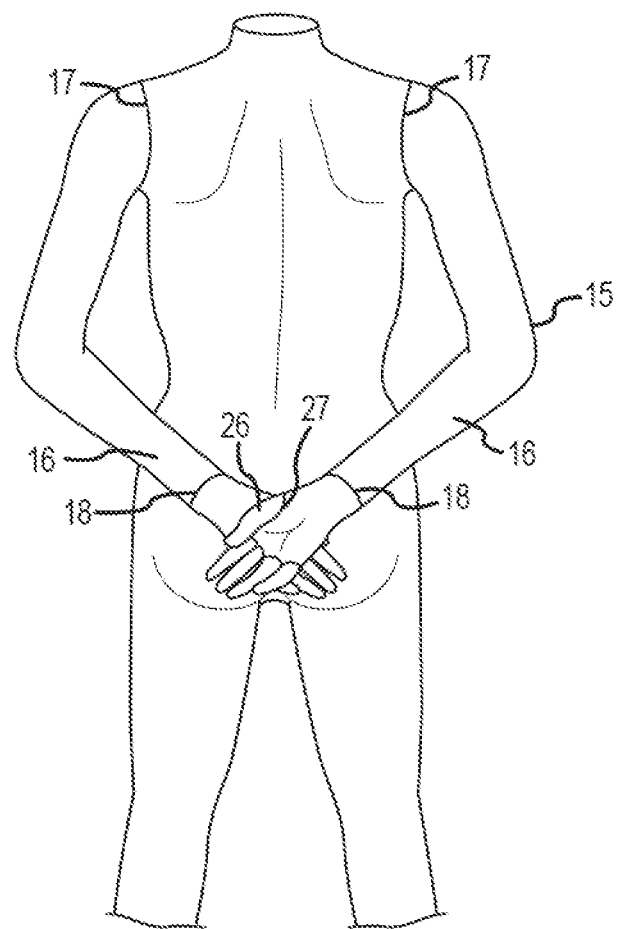
FIG. 2 is a rear view of the full-size female manikin of FIG. 1.

FIG. 2 is a rear view of the full-size female manikin shown in FIG. 1 showing arm-body joint interface 17, hand 25, thumb 26, hand-thumb joint interface 27, arms 15, wrists 16, and arm-wrist joint interfaces 18.

FIG. 3 is a front view of a portion of the female manikin 10 of FIG. 1 depicting the detachable leg 20 of the manikin being pivoted sideways toward the other leg 20 in preparation for dressing the manikin such that a portion of keybody 50 of compression spring assembly 21 (see FIG. 4) on leg 20 is visible. Pivot key 56 in keybody 50 (shown in FIG. 4A) serves as an axis of rotation allowing keybody 50 to rotate thereon thus allowing the lower part of leg 20 to move toward the other leg when an inward force is exerted on the lower part of leg 20. Guide boss 70 is visible on leg flangeboard 143 of compression spring assembly 21 on leg 20, and body flangeboard recess 72 is visible on body flangeboard 142. Guide boss 70 and flangeboard recess 72 are designed to mate with each other when the joint is in closed position.

Figures 4A, 4B:
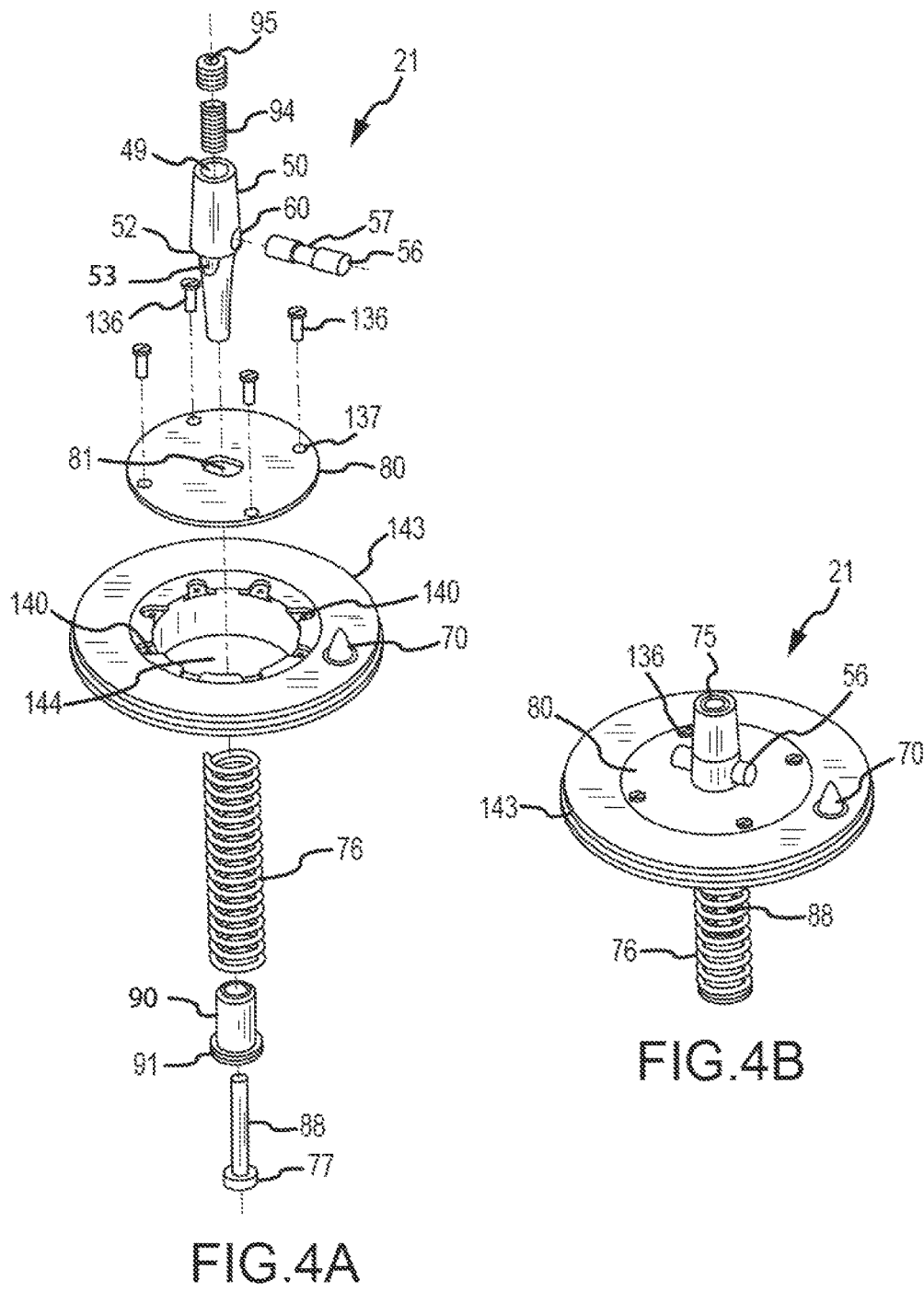
FIG. 4A is a perspective exploded view of the compression spring assembly.
FIG. 4B shows the parts of FIG. 4A as assembled.

FIG. 4A is a perspective exploded vie\v of the compression spring assembly 21, which comprises threaded set screw 95 designed in use to screw into threads in a recess 49 in the top of keybody 50, holding small compression spring 94 in place within recess 49. Pivot key 56 comprises a narrowed middle section 57 and is designed to fit within keybody key portal 60 of keybody 50, which is vertically elongated to allow pivot key 56 to tilt up and down within it, exerting pressure to compress small compression spring 94, which allows the leg to rotate up and down on an axis perpendicular to the long dimension of pivot key 56 and running through the center of pivot key middle section 57, as pivot key 56 tilts up and down in keybody key portal 60.

Figure 8A:
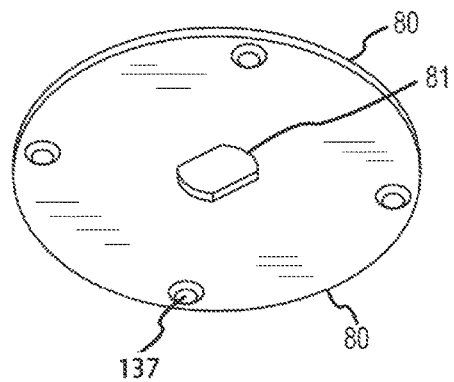
FIG. 8A is an enlarged bottom perspective view of the key assembly plate shown in FIG. 4.
Figure 8B:
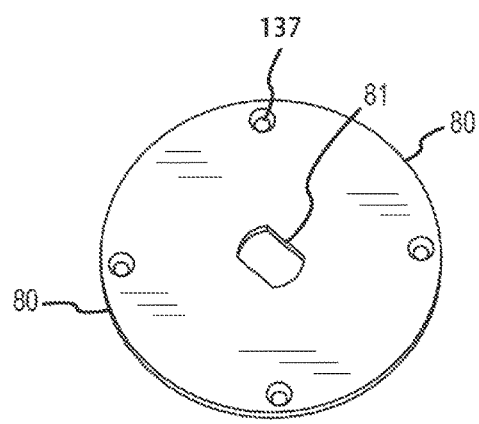
FIG. 8B is a top perspective view of the key assembly plate of FIG. 8A.
Figure 8C:
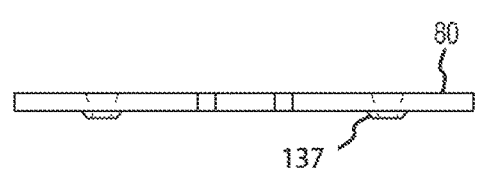
FIG. 8C is a side cross-sectional view of the key assembly plate of FIG. 8A.

Key assembly plate 80 comprises is shown in FIGS. 8A, 8B and 8C. It comprises screw holes 137 and slot 81.

Figure 6:
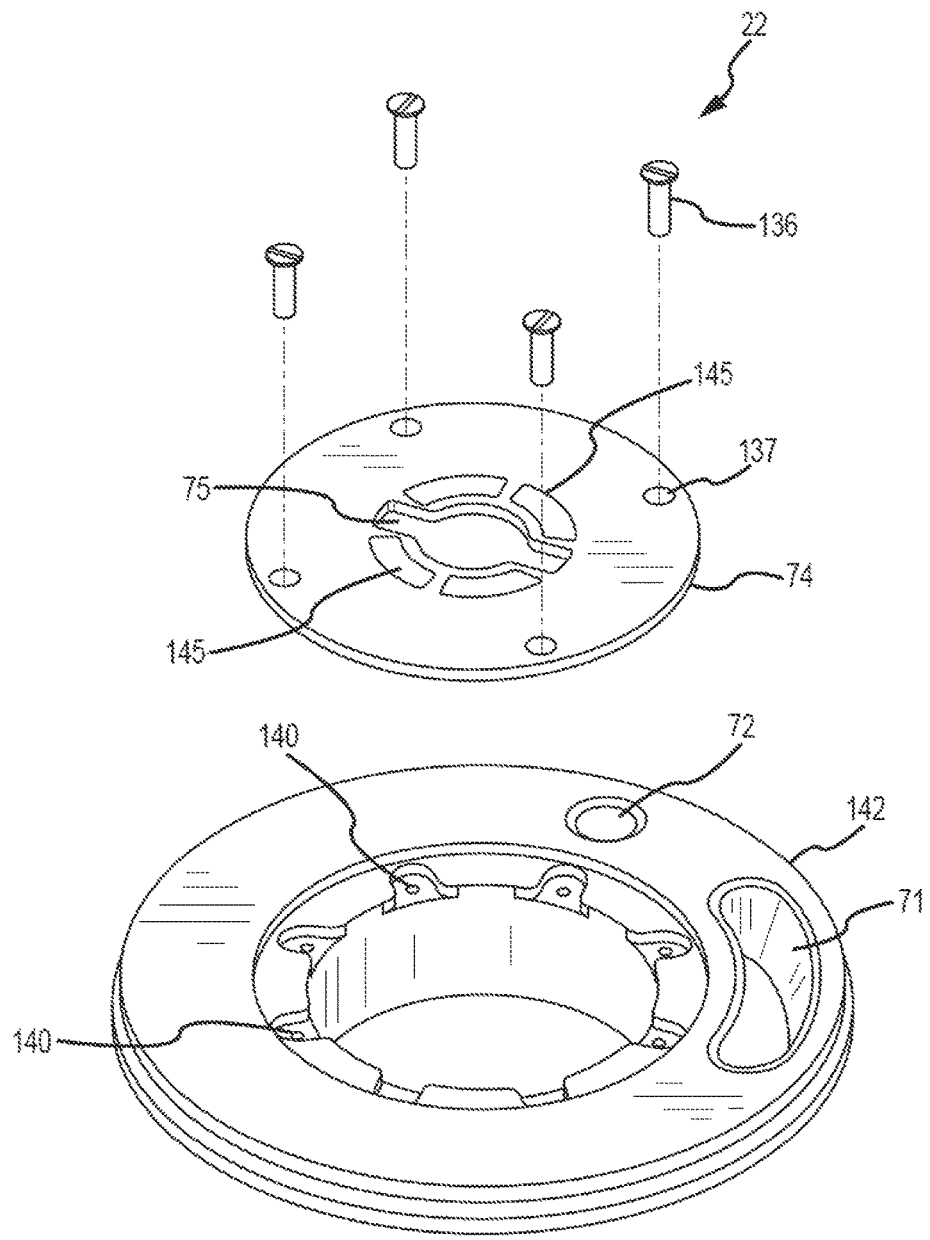
FIG. 6 is an exploded view of the keyway assembly comprising a body flangeboard and keyway plate designed to be on the body of a manikin and to mate with the compression spring assembly on the leg shown in FIG. 5.

Leg flangeboard 143 is equipped on its top surface with guide boss 70, which is designed in use to fit into both body flangeboard groove 71 and body flangeboard recess 72 (shown in FIG. 6). Guide boss 70 is depicted as conical in shape, but can also be cylindrical or any other shape capable of being inserted into recess 72 and sliding in groove 71 of body flangeboard 142 (see FIGS. 6 and 7).

Key assembly plate 80, comprising screw holes 137 and key assembly plate slot 81 is designed to be screwed onto leg flangeboard 143 by means of keyway orientation screws 136. The plurality of threaded screw recesses 140 in leg flange board 143 allows key assembly plate 80 to be positioned on leg flangeboard 143 in up to 20 different orientations, thereby determining the orientation of pivot key 56, which determines the primary direction in which leg 20 can be rotated (since leg 20 rotates on a primary axis of rotation through the long dimension of pivot key 56).

Slot 81 in key assembly plate 80 is rectangular in shape with curved ends designed to accommodate the bottom part of keybody 50 which is designed with a shoulder 52 between the bottom and upper portion of keybody 50. The bottom part of keybody 50 comprises flat portions 53 on either side so as to fit into slot 81 and prevent rotation of keybody 50 sideways in slot 81. The flat surfaces of the bottom part of keybody 50 are parallel to the long dimension of pivot key 56 when it is inserted through key portals 60. The bottom of keybody 50 tapers downwardly so that keybody 50 can rotate in slot 81 when a force normal to the primary (inward) force is exerted on leg 20, this normal force being described herein as a secondary (forward or backward) force. This secondary force results in pivot key 56 tilting within key portals 60 in keybody 50, which portals extend higher than the height of pivot key 56 within them, so that pivot key 56 is able to tilt within key portals.

In use, the bottom of keybody 50, which extends through slot 81, also extends through central opening 144 in leg flangeboard 143 and into large compression spring 76, where it receives the threaded top of compression spring retaining rod 88 into a corresponding threaded recess in the bottom of keybody 50. Large compression spring 76 is positioned over cylindrical portion 92 of retaining bushing 90, resting on lip 91 of retaining bushing 90. Compression spring retaining rod 88 extends through retaining bushing 90 and is held in place by spring retaining nut 77.

FIG. 4B shows compression spring assembly 21 with the parts assembled, wherein small compression spring 94 is not visible within recess 49 inside keybody 50 but touches middle section 57 of pivot key 56 within keybody key portal 60, and is able to compress as pivot key 56 pivots within keybody key portal 60.

Figure 5:
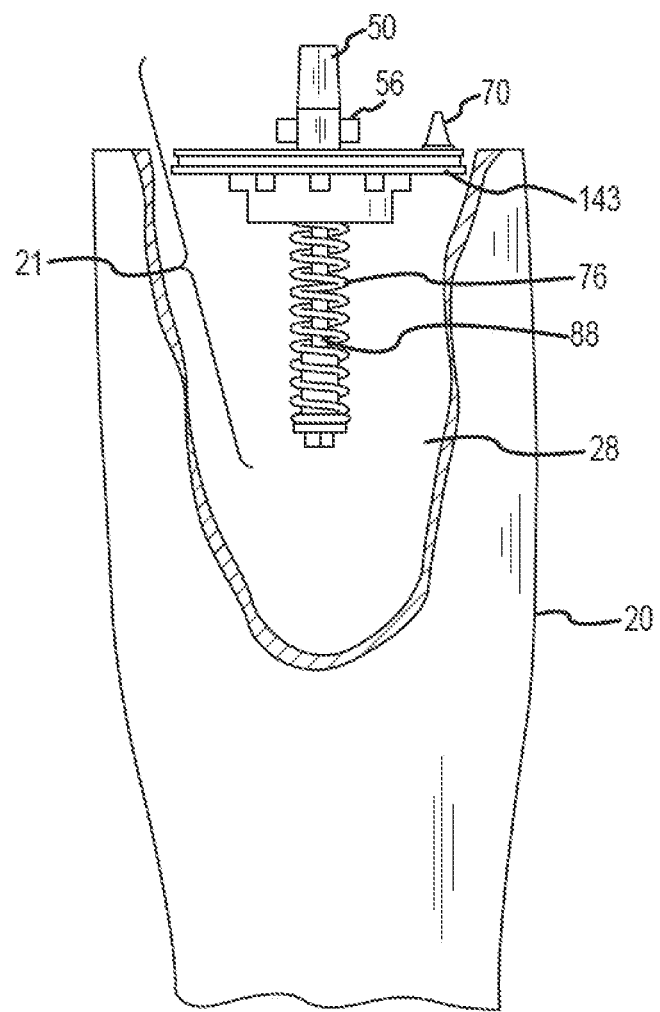
FIG. 5 is a cutaway side view of the assembled compression spring assembly of FIG. 4B inserted into a void in the leg of a manikin.

FIG. 5 is a cutaway side view of the assembled compression spring assembly 21 of FIG. 4B inserted into leg void 28 in leg 20.

FIG. 6 is an exploded view of keyway assembly 22 which is attached to body 35 of the manikin. Keyway assembly 22 comprises body flangeboard 142 and keyway plate 74. Keyway assembly 22 is designed to mate with compression spring assembly 21 on the leg shown in FIG. 5. Keyway plate 74 comprises keyway 75, which is a circular opening with rectangular extension on opposite sides, sized and shaped to receive pivot key 56 in use. In use, pivot key 56 is lined up with and inserted through keyway 75 and then turned so that it is no longer lined up with keyway 75, thus preventing compression spring assembly 21, of which it is a part, from separating from keyway assembly 22. This prevents body 35 of the manikin from separating from leg 20. Keyway plate 74 also comprises locating ramps 145. Locating ramps 145 are configured such that the two ramps flank each side of keyway 75. The ramps each rise in height from their far ends toward their other ends, where the two ramps meet, leaving a gap into which, in use, pivot key 56 fits, snapping into place when it is turned 90° after being inserted through keyway 75. This helps ensure that pivot key 56 will not accidentally be rotated horizontally during use when the joint is partially opened. If it could rotate horizontally, it could pass through keyway 75, resulting in the joint parts separating. Keyway assembly 22 also comprises body flangeboard 142. Body flangeboard 142 comprises flangeboard recess 72 and flangeboard groove 71 designed to receive guide boss 70 of leg flangeboard 143 (see FIG. 4) in use. Body flangeboard 142 also comprises threaded screw recesses 140 designed to receive screws 136 used to fasten keyway plate 74 to body flangeboard 142.

Figure 7A:
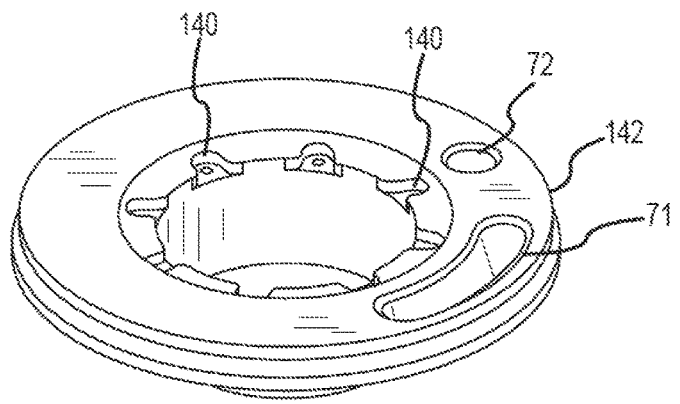
FIG. 7 A is an enlarged perspective view of the body flangeboard of FIG. 6
FIG. 7B is an enlarged perspective view of a leg flangeboard as shown in FIG. 4. The two flangeboards are designed to mate with each other in use.
Figure 7B:
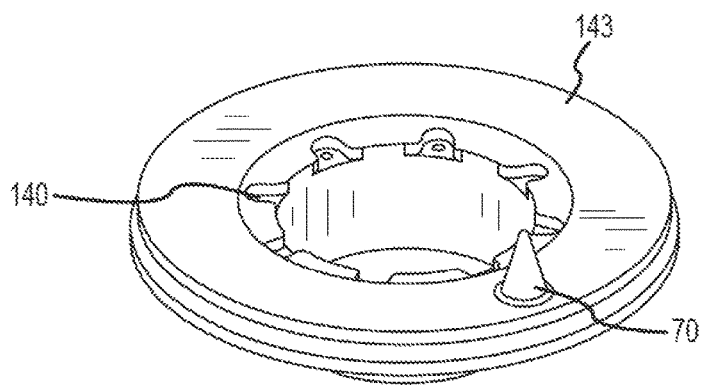

FIG. 7A is an enlarged perspective view of body flangeboard 142 of FIG. 6 showing flangeboard recess 72 and flangeboard groove 71. FIG. 7B is an enlarged perspective view of leg flangeboard 143 as shown in FIG. 4 showing guide boss 70. The two flangeboards 142 and 143 are sized and shaped to mate with each other in use. The flangeboards are, in embodiments, molded via injection molding as a single piece. Leg flangeboard 143 as depicted comprises guide boss 70. Body flangeboard 142 comprises groove 71 and recess 72 for receiving guide boss 70 in use. A lug (not shown) inside the flangeboards 142 and 143 helps align them properly within the joint.

FIG. 8A is an enlarged bottom perspective view of key assembly plate 80 shown in FIG. 4, showing threaded screw recesses 140. FIG. 8B is a top perspective view of key assembly plate 80 of FIG. 8A showing the bottom of threaded screw recesses 140. FIG. 8C is a side cross-sectional view of the key assembly plate of FIG. 8A showing threaded screw recesses 140.

Figure 9A:
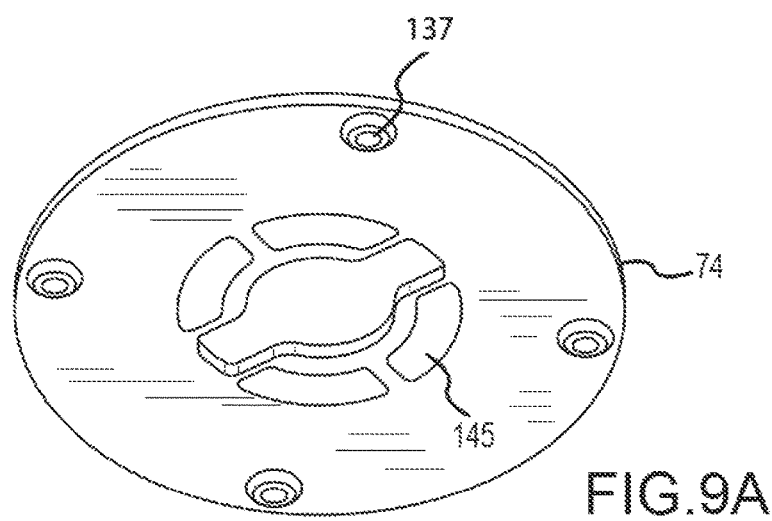
FIG. 9A is an enlarged bottom perspective view of the keyway plate shown in FIG. 6.
Figure 9B:
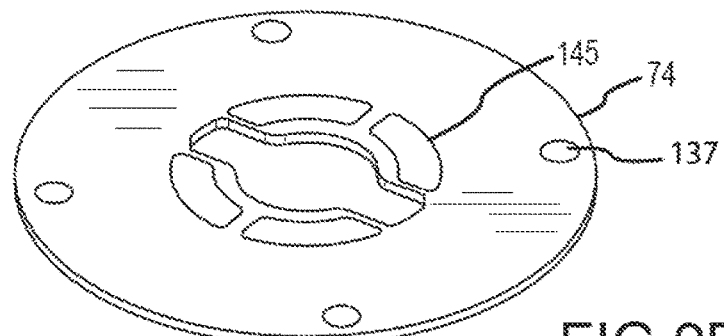
FIG. 9B is an enlarged top perspective view of the keyway plate of FIG. 9A.
Figure 9C:
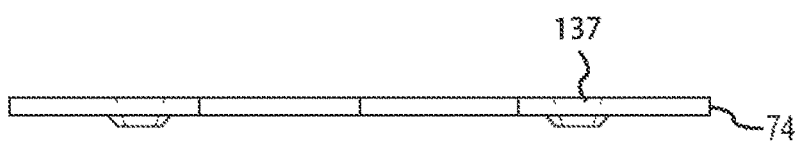
FIG. 9C is a side cross-sectional view of the keyway plate of FIG. 9A.
Figure 10:
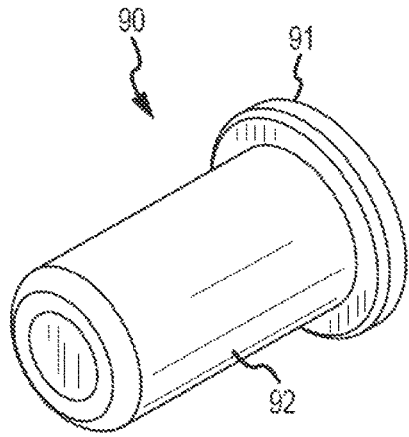
FIG. 10 is an enlarged perspective view of the retaining bushing shown in FIG. 4.

FIG. 9A is an enlarged bottom perspective view of keyway plate 74 shown in FIG. 6 showing the bottom of threaded screw recesses 140 and locating ramps 145. FIG. 9B is an enlarged top perspective view of keyway plate 74 of FIG. 9A showing the top of threaded screw recesses 140 and locating ramps 145. FIG. 9C is a side cross-sectional view of keyway plate 74 of FIG. 9A showing threaded screw recesses 140. FIG. 10 is an enlarged perspective view of retaining bushing 90 shown in FIG. 4A. Retaining bushing 90 comprises lip 91 and cylindrical portion 92. The edges of bushing 90 are chamfered in embodiments so that its insertion into large compression spring 76 is not hindered by rough edges.

Figure 11:
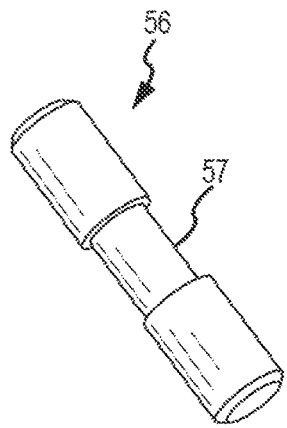
FIG. 11 is an enlarged perspective view of the pivot key shown in FIG. 4.
Figure 12:
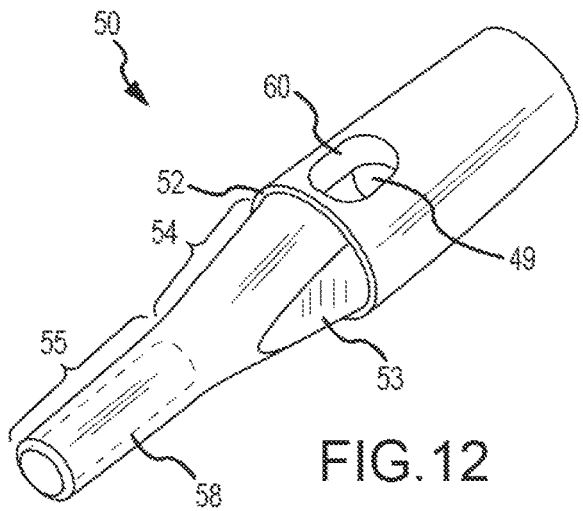
FIG. 12 is an enlarged perspective view of the keybody shown in FIG. 4.

FIG. 11 is an enlarged perspective view of pivot key 56 shown in FIG. 4A showing narrowed middle section 57, which in use retains small compression spring 94 in place in recess 49 of keybody 50 shown in FIG. 12. The edges of pivot key 56 are chamfered in embodiments so that the function of the key is not hindered by rough edges.

FIG. 12 is an enlarged perspective view of keybody 50 shown in FIG. 4A. Keybody 50 comprises keybody key portal 60, which is adapted in use to receive pivot key 56 (FIG. 11), and allow it to rotate up and down. Keybody 50 also comprises shoulder 52, which in use rests atop key assembly plate 80 (FIG. 4A). Keybody 50 also comprises flat portions 53 on opposite sides 53 and is tapered downwardly so as to allow keybody 50 to tilt within key assembly plate slot 81 (see FIG. 4). Keybody 50 defines a recess 49 sized to accommodate small compression spring 94 in its top portion, and threaded inside at the top to receive set screw 95 (see FIG. 4). The bottom, stretch section 55 of keybody 50 is hollowed out and threaded to provide a receiving channel 58 allow insertion of the compression spring retaining rod 88, which is threaded at the top. The bottom end of keybody 50 is chamfered in embodiments such that it does not interfere with the action of large compression spring 76 during actuation of the stretch joint.

To make a manikin comprising a stretch joint comprising a compression spring assembly 21 and a keyway assembly 22 as described above, body flangeboard 142 along with screw recesses 140 is molded into manikin body 35 by allowing the polymer mix that is used to mold the body to flow around the flangeboard or portions thereof, leaving flangeboard groove 71, flangeboard recess 72 and threaded screw recesses 140 open. Leg flangeboard 143 is similarly molded into leg 20. The flangeboards are single pieces, in embodiments made by injection molding. They are placed and oriented into the manikin mold during the manikin molding processes. In embodiments they comprise a location lug for correct orientation and tooled in during the process of developing the manikin form. Typically each manikin has a flangeboard at every joint that is over-molded in. The manikin material itself holds the flangeboards in place. Sufficient void space should be provided inside the manikin body to accommodate the upper portion of assembled compression spring assembly 21 (see FIG. 4B) inside the manikin.

Compression spring assembly 21 is assembled by attaching key assembly plate 80 to leg flangeboard 143 with screws 136. Pivot key 56 is inserted into keybody key portal 60. Small compression spring 94 is inserted into recess 49 of keybody 50, and set screw 95 is screwed into place to hold spring 94 under compression, in embodiments at about 50 pounds, in recess 49 between set screw 95 and pivot key 56. The bottom portion of keybody 50 is then inserted through slot 81 of key assembly plate 80.

The top of large compression spring 76 is then placed over the bottom portion of keybody 50 that extends below leg flangeboard 143. Retaining bushing 90 is inserted into the bottom of large compression spring 76. Compression spring retaining rod 88, which is threaded at the top, is inserted through retaining bushing 90 and screwed into the hollow bottom of keybody 50, which is threaded to receive it. In embodiments, the bottom of retaining rod 88 is equipped with retaining nut 77 as an integral part thereof, which holds the compression spring assembly in place.

The manikin body, comprising one or more compression spring stretch joints with keyway assemblies 22 attached, can be packed and shipped separately from the detachable manikin parts with attached compression spring assemblies 21. For example, the body can include other parts such as non-detachable arms and one leg. At least one detachable leg can be packed and shipped separately from the body, and easily attached to the body by an end user.

To attach leg 20, comprising compression spring assembly 21, to body 35, comprising keyway assembly 22, leg flangeboard 143 at the top of leg 20 is aligned with body flangeboard 142 such the flangeboard surfaces are parallel and such that guide boss 70 is proximal to the end of groove 71 farthest from recess 70 and pivot key 56 is proximal to keyway 75. Leg 20 is moved toward body 35 such that guide boss 70 engages with groove 71, and the top of keybody 50 and pivot key 56 pass through keyway 75. The leg is then rotated such that guide boss 70 in groove 71 moves toward the end of groove 71 closest to recess 72 and pivot key 56 is positioned so as not to be able to pass through keyway 75. The manikin parts will thus be locked together. When rotation is stopped by guide boss 70 reaching the end of groove 71 closest to recess 72, leg 20 is pulled away from body 35, stretching large compression spring 76, so as to disengage guide boss 70 from groove 71, and leg 20 is then rotated until guide boss 70 is proximal to recess 72. At this point the pulling force on leg 20 is stopped such that the compressive force of large compression spring 76 causes guide boss 70 to seat within recess 72.

To partially open the joint, downward force is exerted on large compression spring 76 in detachable leg 20 to move leg 20 toward the other leg. This causes large compression spring 76 to stretch and keybody 50 to rotate on pivot key 56, so that leg 20 rotates to a partially open position. It is prevented from sliding sideways because slot 81 in key assembly plate 80 does not allow sideways movement of the manikin parts with respect to each other. To return the joint to the closed position, exertion of the inward force is stopped, allowing the joint to automatically return to its closed position as the stretch in large compression spring 76 is reduced. When the joint is in closed position, it is exerting a compressive force of about 35 pounds to about 75 pounds to hold the manikin parts together. The operator therefore needs to exert a force greater than this to partially open the joint. The operator needs to exert a force greater than the compressive force exerted by large compression spring 76 when the joint is closed.

To detach leg 20 from body 35 the leg is pulled away from the body a short distance, stretching large compression spring 76, so as to disengage guide boss 70 from recess 72, and then leg 20 is rotated so as to bring guide boss 70 into alignment with groove 71 until guide boss 70 is proximal to the end of groove 71 closest to recess 72. The pulling force on leg 20 is stopped such that the compressive force of large compression spring 76 causes guide boss 70 to seat in the end of groove 71. Leg 20 is rotated until guide boss 70 reaches the end of groove 71 farthest from recess 72, at which point pivot key 56 will be aligned with keyway 75, and can be pulled through keyway 75, thus separating leg 20 from body 35.

To dress the manikin with a single detachable leg 20 hereof in a pair of pants, an operator inserts a first leg that is integral with the body into the appropriate pant leg without pulling the pants up. At this point the operator can attach that leg to stand 42 if desired. The operator then exerts a downward pressure on large compression spring 76 by moving detachable leg 20 toward the other leg, taking advantage as needed of the leverage provided by exerting pressure at a lower point of leg 20, to open the joint as shown in FIG. 3 and move the lower portion of detachable leg 20 closer to the leg that is integral to the manikin. The lower down on detachable leg 20 the force is exerted, the stronger the force opening the joint will be due to the leverage provided by the leg length. As the force is exerted, large compression spring 76 in detachable leg 20 will stretch and leg 20 will pivot on a pivot point at the edge of joint interface. The leg and body parts will not be able to slide on each other because they are prevented from doing so by rigid keybody 50 that extends through the interface between the leg and body. With the joint open, the operator inserts detachable leg 20 into the second leg of the pair of pants, stops holding the joint open and allows detachable leg 20 to rotate back to its original closed position, and pulls up the pants.

Sometimes while dressing the manikin, it becomes necessary to move leg 20 away from body 35 a short distance so that the manikin parts are no longer touching. In this case, the ability of small compression spring 94 and large compression spring 76 to stretch and return to their original position allows the leg to be moved away from the body a short distance along two, perpendicular axes.

An embodiment of the stretch joint uses an elastomeric cord as the stretch element, by means of elastomeric manikin joint FIG. 13 shows such a manikin joint in closed position so that only the leg-body interface 211 is visible.

FIG. 13 is a cross-sectional front view of elastomeric manikin joint 230 in closed position with leg 20 abutting body 35 along leg-body interface 211. Joint 230 comprises a protective tube 270 that fits inside and is bonded to attachment tube 280, which is molded into leg 20. Elastomeric cord 250 is disposed under tension within protective tube 270, held in place by top eye bolt 272 and bottom eyebolt 274. Top eye bolt 272 is threaded and screwed into top eyebolt nut 276 (in embodiments an internal "T" nut), that is molded into a flangeboard which is then molded into body 35 by allowing the polymer mix that is used to mold the body to flow around the board or portions thereof, leaving the threaded portion of the nut exposed for later insertion of top eye bolt 272. Bottom eye bolt 274 is also threaded and held in place by being extended through a hole in tube bottom cap 275 and being screwed into bottom nut 277. Attachment tube 280 is typically molded place when leg 20 is molded by being inserted prior to molding in a mold for the leg such that the polymeric material used to mold the leg coats it and the mold walls to form a tube wall 227 that is typically coextensive with leg shell wall 224. FIG. 13 also shows that manikin leg 20 is substantially hollow, being formed so as to enclose leg void 228. Also depicted in FIG. 13 is pivot pin 260, the top end of which is fixedly attached to body cavity 35 by being threaded and screwed into an anchoring body nut (not shown) molded into body 35 in the same way as anchoring body nut 276 described above. The bottom end of pivot pin 260 extends through a hole in leg shell wall 224 into leg void 228.

FIG. 14 shows leg 20 pivoted to a partially-open position around pivot point 256. Pivot pin 260 is sized and located such that it allows leg 20 to pivot in a downward direction to a partially-open position on pivot point 256, which is located on a notional line defined by top eye bolt 272 and pivot pin 260. In embodiments, pivot pin 260 has a diameter of 3/8" and a length of 3" with a threaded top. The location of pivot pin 260 on a notional line between pivot point 256 and top eye bolt 272 allows leg 20 to pivot on pivot point 256 without twisting horizontally, and causes leg plateau 221 to fit snugly and exactly into body rim 237 when the joint is closed to minimize gaps in leg-body interface 211 so that the interface is not easy to detect visually. Leg plateau 221 and body rim 237 are chamfered so as to facilitate proper seating of leg plateau 221 into body rim 237. Elastomeric cord 250 is under about 37.5 pounds of tension in the embodiment depicted in FIGS. 13 and 14 with joint 230 in closed and is under about 39.75 pounds of tension in the embodiment depicted in FIG. 13 with joint 230 in partially-open position.

Figures 15A, 15B:
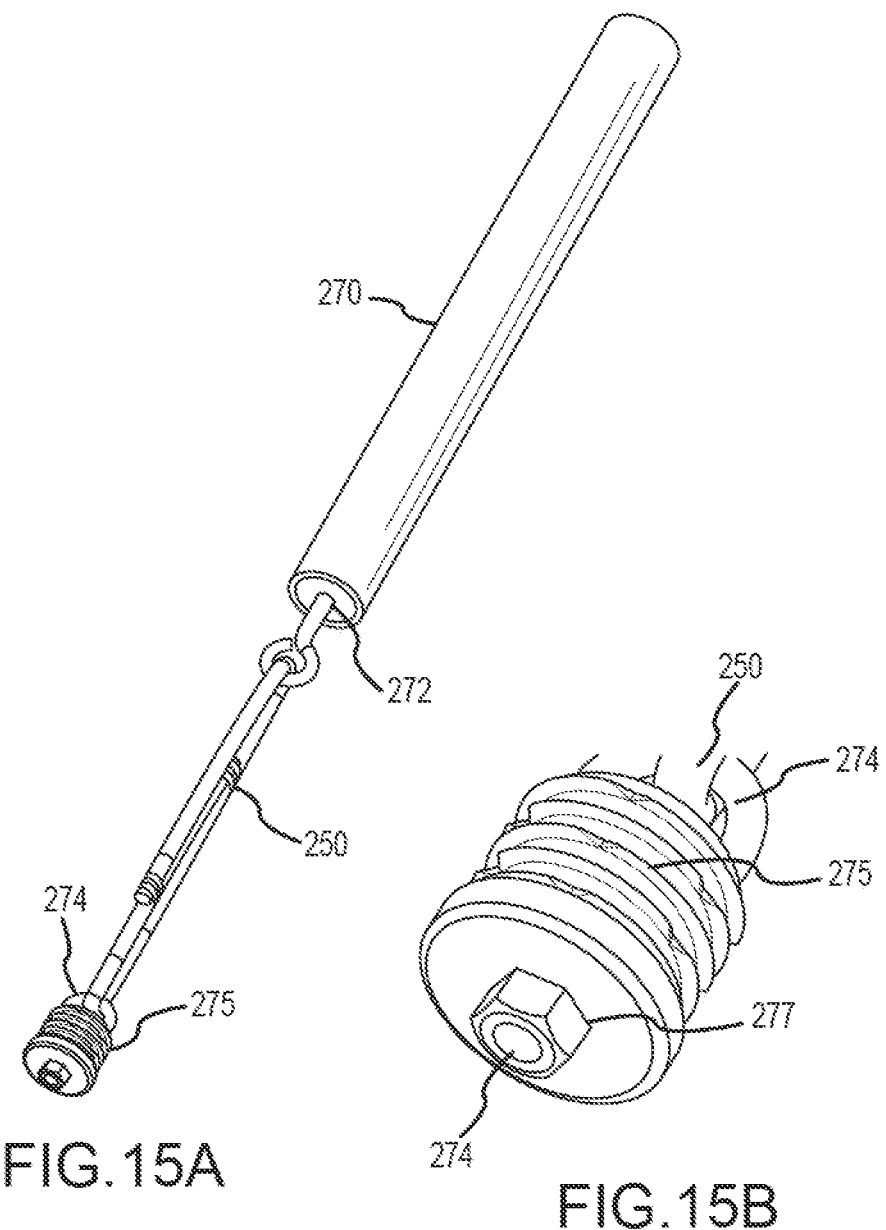
FIG. 15A is a perspective view showing the elastomeric cord attached to a bottom cap in position for insertion into a protective tube.
FIG. 15B is an enlarged view of the bottom cap.

FIG. 15A is a perspective view showing elastomeric cord 250 attached to bottom cap 275 in position for insertion into protective tube 270. FIG. 15B is an enlarged view of bottom cap 275. FIG. 15A shows elastomeric cord 250 attached to bottom cap 275 by means of bottom eye bolt 274 and bottom nut 277, equipped with top eye bolt 272, and assembled and in position to be inserted into protective tube 270. Elastomeric cord 250 is attached to bottom eye bolt 274, which is inserted through a hole in bottom cap 275 and secured by screwing bottom nut 277 onto the threaded portion of bottom eye bolt 274. Bottom cap 275, shown enlarged in FIG. 15B, comprises threads 279 to provide friction for holding it in place in the bottom of protective tube 270.

Figure 16:
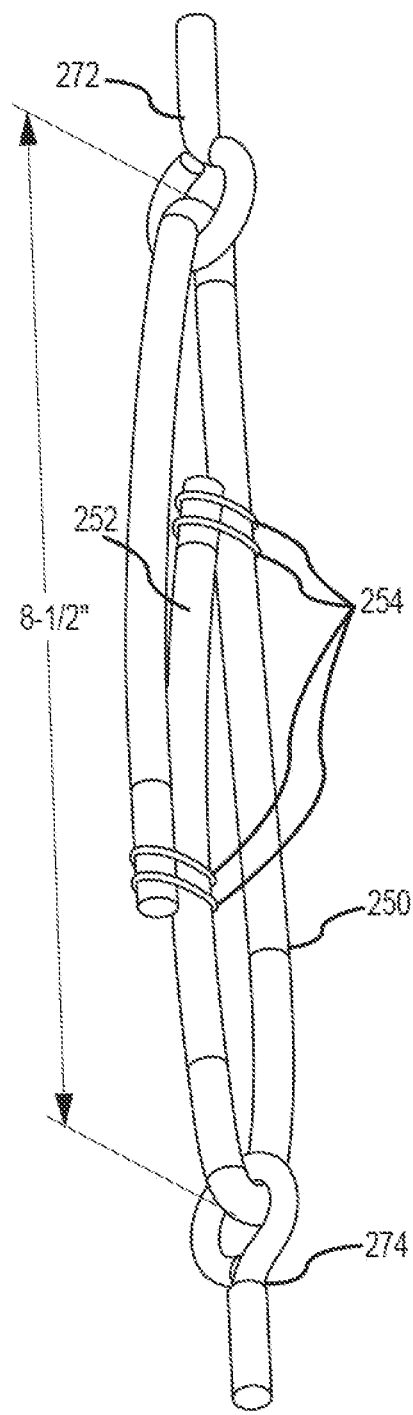
FIG. 16 shows the elastomeric cord equipped with top and bottom eye bolts.

FIG. 16 shows an elastomeric cord assembly comprising elastomeric cord 250 equipped with top and bottom eye bolts 272 and 274 respectively. Elastomeric cord 250 is threaded through the open portions of and top and bottom eye bolts 272 and 274. Elastomeric cord 250 is looped with the ends overlapping and fastened to the adjacent portion of the loop with fasteners 254, such as hog rings or staples, to form a bridge 252 angled between the sides of the loop for extra strength.

Figure 17:
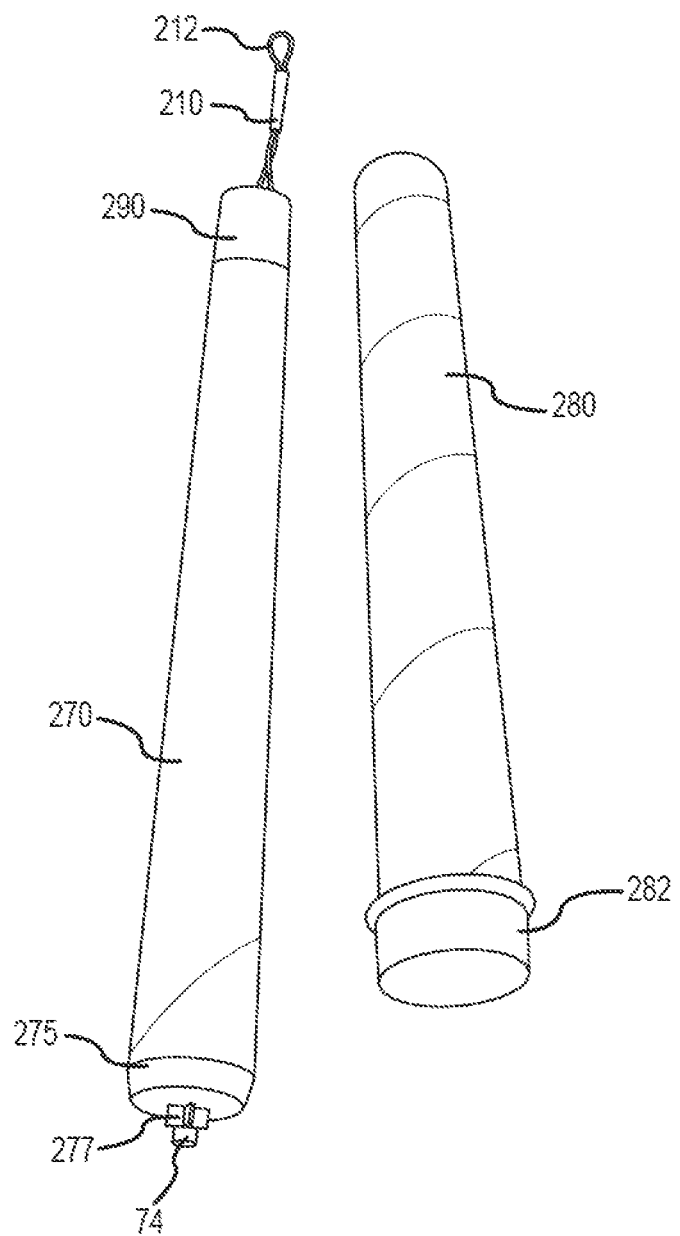
FIG. 17 shows a protective tube, bottom cap and guide wire with a tensioning spacer in place at the top end of the tube and an attachment tube and a bottom cap therefor.

FIG. 17 shows a protective tube component 270 of manikin leg joint 230, with its bottom cap 275 and bottom eye bolt 274, equipped with tensioning spacer 290 and ready for insertion into a manikin leg. Spacer 290 is fomled using a rubber tube section of a length suitable for making spacer 290. Spacer 290 should have a length sufficient to allow a normal human operator to dismantle it, working inside the assembled open stretch joint. For example, spacer 290 can have a length of about 1 to about 4 inches and in embodiments about 1 to about 3 or about 2 inches. The rubber tube is slit lengthwise to form a slit tube section and the cut ends are taped with any retaining tape known to the art form spacer 290. Spacer 290 is detachably attached to protective tube 270 as described below.

Top eye bolt 272 of elastomeric cord 250 (see FIG. 16) is operably connected to the bottom of a guide wire connector by means known to the art, such as by a connector screwed onto the threaded portion of top eye bolt 272. Elastomeric cord 250 is threaded through the open portion of top eye bolt 272. Guide wire 210 is used to insert the elastomeric cord assembly into protective tube 270. The elastomeric cord assembly (FIG. 16) is stiff enough to be easily inserted into protective tube 270. Upper guide wire loop 212 is ready for connection to a traction device for stretching elastomeric cord 250.

Tensioning spacer 290 comprises a cylindrical element such as a slit rubber tube, held together with retaining tape. Spacer 290 is formed using a rubber tube section of a length suitable for making spacer 290. The spacer should have a length sufficient to allow a normal human operator to dismantle it, working inside the assembled open stretch joint. For example, the spacer can have a length of about 1 to about 4 inches and in embodiments about 1 to about 3 or about 2 inches. The rubber tube is slit lengthwise to form slit tube section and the cut ends are taped with any retaining tape known to the art form spacer 290. Spacer 290 can be attached to protective tube 270 by means known to the art. In an embodiment, this is accomplished by inserting a retaining bolt through the round portion of top eye bolt 272 orthogonal to the threaded portion of top eye bolt 272 to hold elastomeric cord 250 inside protective tube 270 under extra tension prior to insertion of protective tube 270 into a manikin leg. This effectively attaches spacer 290 to protective tube 270. Temporary attachment tube 281, equipped with bottom cap 282 is shown to the right of protective tube 270.

To insert the elastomeric cord assembly into the manikin leg, protective tube 270 containing the elastomeric cord assembly, with bottom cap 275, is fully inserted into the bottom of temporary attachment tube 281 by pushing bottom cap 275 into temporary attachment tube 281 with sufficient force to create a pressure fit. Elastomeric cord 250 and guide wire 210 are inserted through temporary attachment tube 281 until at least upper guide wire loop 212 extends from the top of spacer 290. Temporary attachment tube 281 is used to help align spacer 290 during the stretching of the elastomeric cord 250 in the process of installing it into the manikin leg, and to lend protection and extra strength to protective tube 270.

A second, substantially identical attachment tube 280 is molded into manikin leg 20 as described above with respect to FIG. 13. (Cap 282 is shown attached to the bottom of temporary attachment tube 281 in FIG. 17 to illustrate how it is affixed to attachment tube 280 prior to its being molded into manikin leg 20). Cap 282 is used in the molding process to prevent debris from entering attachment tube 280 during the process.

Protective tube 270 inside temporary attachment tube 281 is laid down on a board and secured in place against a stop abutting their top ends that prevents them from moving when traction is applied to guide wire 210. There is a gap in the stop to allow guide wire 210 to extend beyond the stop so that it can be fastened to a traction cable. The gap is sized and shaped to permit elastomeric cord 250 to stretch through it. An openable holder fixedly attached to the board holds the lower ends of tubes 270 and 281. Protective and temporary attachment tubes 270 and 281 are kept in alignment with respect to the stop by first and second alignment blocks adjacent to the stop and adjacent to the upper end of the tubes. Upper loop 212 of guide wire 210 is attached to a clip connected via dip connector to a traction cable. The traction cable is in turn connected to a stretching machine such as a rotating shaft powered by hydraulic or electrical energy, capable of exerting sufficient force to stretch elastomeric cable 250.

Once the components are connected and the stretching machine is activated, tension is exerted on elastomeric cord 250 through guide wire 210 sufficient to pull the top of elastomeric cord 250 out of the upper end of protective and temporary attachment tubes 270 and 281. The traction cable transmits the pulling force to elastomeric cord 250 via guide wire 210 and its connecting links described above. The top ends of protective and temporary attachment tubes 270 and 281 are held in place by the stop as elastomeric cord 250 is stretched through the gap in the stop.

A spacer retaining bolt inserted sideways through the opening of top eye bolt 272 and extending across the top of spacer 290 maintains elastomeric cord 250 in stretched position and the traction cable and guide wire 210 are disconnected from top eye bolt 272. Temporary attachment tube 281 is slid down and off from the bottom end of protective tube 270, and elastomeric cord 250 (not visible inside protective tube 270 and spacer 290) is held in stretched position by the spacer retaining bolt Protective tube 270 and its attached components are positioned so as to allow top eye bolt 272 to be screwed into an anchoring body nut which is molded inside manikin body 35.

A pivot pin 260 is screwed into manikin body 35 and secured by a body nut molded into the body. Protective tube 270 is coated with an adhesive and inserted into attachment tube 280 that has been molded into manikin leg 20. Spacer 290 is still in place atop protective tube 270. The adhesive is allowed to dry. Spacer 290 is then removed from protective tube 270 by removing the retaining tape 294 and pulling the spacer away from protective tube 272 and elastomeric cord 250.

FIG. 18 shows the elastomeric manikin joint with spacer removed and pivot pin 260 extending from body 35 into leg 20. Leg plateau 221 sized and shaped to confom1 to a corresponding hollow fom1ed by body rim 237 can also be seen in this figure. Manikin body 35 and leg 20 can be pulled apart as shown, stretching elastomeric cord 250 to partially open manikin joint 200 to show pivot pin 260 and the top of elastomeric cord 250 which is stretched between body 35 and leg 20 and extends into the protective tube that was adhesively fixed to attachment tube 280 that was molded into leg 20.

Protective tube 270 can be made of cardboard, metal, plastic or other material having sufficient stiffness to withstand the forces exerted on it over time by elastomeric cord 250. Elastomeric cord 250 is an elastomer material which can be a bungee cord of sufficient strength, e.g., capable under tension of exerting about 35 to about 75 pounds of pull, to maintain elastomeric joint 200 in closed position, and yet allow an operator to open joint 200 in order to move leg 20 into position such that both legs can easily be inserted into a pair of pants, shorts, or other lower body garment Other elastomeric elements such as springs, air pressure cylinders, and other devices capable of allowing the leg to be pulled away from the body by the exertion of force by an operator and automatically returning it to closed position when that force is removed can also be used in place of the bungee cord illustrated. As depicted in FIG. 16, rings, such as hog rings, staples, sleeves, or other fasteners made of metal or other material of sufficient strength to withstand the forces on them in use can be used to attach the ends of elastomeric cord 250 to itself to form the configuration shown. Fittings such as eye bolts, nuts, and caps can be made of any material known to the art, such as metal or plastic, having sufficient strength and durability to withstand the forces exerted on them during use.

The mold used for limbs such as arms legs, hands, thumbs, etc. which are intended to be attached to the body by means of the elastomeric joint described herein comprises an attachment tube which is molded into the manikin limb so that it is covered with the shell material that forms the walls of the limb and so that it is securely embedded in the limb. Nuts for attaching the elastomeric cord and pivot pin to the manikin body or other manikin parts for which a joint is being made, are molded into the body or other part, e.g., by attaching them to a flangeboard inside the mold.

When it is desired to operate a stretch joint hereof to dress a manikin in a pair of pants, an operator detaches a first leg from its stand 42 or other support, and inserts that leg into the appropriate pant leg without pulling the pants up, then reattaches the clothed leg to stand 42. The operator then exerts pressure on a second leg 20, that is equipped with a stretch joint hereof, to open the joint and move it closer to the first leg. The lower down on second leg 20 the force is exerted, the stronger the force pulling the joint apart will be due to the leverage provided by the leg length. As the force is exerted, second leg 20 will pivot on pivot point 256 at the edge of joint interface 211. Pivot pin 260 is attached to body 35 and extends into a void space in leg 20. Pivot pin 260 is placed so that it intersects joint interface 211 on a notional line between the elastomeric cord's intersection with the joint interface and the pivot point The pivot pin, so placed, prevents leg 20 from rotating on the single axis that would be provided by the elastomeric cord if the pivot pin were not present, and causes the joint parts not to shift laterally with respect to each other while the joint is opening and dosing. With the joint open, the operator inserts leg 20 into the second leg of the pair of pants, stops holding the joint open and allows the leg 20 to rotate on the pivot point back to its original closed position, then pulls up the pants.

Other elastomeric manikin joints are assembled and operated in a similar manner as the leg-body joint, using parts appropriately scaled in terms of size and elastomeric pull strength.

In an embodiment, a manikin joint connected to first and second parts of a manikin body is provided for allowing the second part to move relative to the first part, wherein the second part comprises an outer shell surrounding a void space, and wherein the joint in closed position forms a joint interface between the parts, the joint comprising: (a) an elastomeric cord attached to the first manikin part and passing through and intersecting the joint interface at a first point therein; the elastomeric cord also being attached to the second manikin part; (b) a pivot point at an edge of the joint interface selected so as to allow movement of the second manikin part relative to the first part in a desired direction when an operator opens the joint by exerting an opening force on the second manikin part; (c) a pivot pin that is (i) attached to the first manikin part, (ii) that passes through and intersects with the joint interface at a second point therein defined by a line between the first point and the pivot point, and (iii) that extends through a hole in the shell of the second part into the void space and is slidable in the hole when the joint opens and closes; wherein locating the pivot pin at the second point prevents rotation of the manikin parts relative to each other around an axis passing through the first point and orthogonal to the joint interface; and wherein when the pivot pin serves to guide the second manikin part back to its original closed position when the opening force on the second part is removed. In an embodiment the first part comprises a manikin body and the second part comprises a manikin leg. In an embodiment, the elastomeric cord passes through the joint interface at about the center thereof. In an embodiment, the pivot point is located at a point on an edge of the joint interface distal to the vertical midline of the body such that the joint opens to move the leg away from the midline. In another embodiment, the pivot point is located at a point on an edge of the joint interface proximal to the vertical midline of the body such that the joint opens to move the leg toward the midline. In an embodiment the pivot point is located at a point on the front edge of the joint interface such that the joint opens to move the arm backward. Alternatively, the pivot pin can be located on a point on a back edge of the joint interface such that the joint opens to move the arm forward. In an embodiment the first manikin part comprises a manikin hand and the second manikin part comprises a manikin thumb, and the pivot point is located at a point on the edge of the joint interface proximal to the hand such that the joint opens to move the thumb toward the hand.

In embodiments, the elastomeric cord has a strength requiring an opening force is between about 35 and about 75 pounds, or between about 45 and about 55 pounds and in embodiments about 50 pounds, and such strength can be achieved by utilizing two or more strands or elastomeric cord or by configuring a single strand by looping the cord and forming an angled bridge between the sides of the loop.

In embodiments, the elastomeric cord is connected to the first manikin part via an eye bolt attached to the cord and screwed into a nut fixedly attached to the first manikin part. The elastomeric cord can be connected to the second manikin part by being contained within a cylinder and connected to the bottom of the cylinder, wherein the tube is fixedly attached to the second manikin part. The tube can be fixedly attached to the second manikin part by being adhesively attached to an attachment tube that is molded into the second manikin part.

Components for stretch joint embodiments hereof are also provided herein, including a component comprising an elastomeric cord disposed within and fixedly attached to a cylinder, wherein the elastic cord is configured to allow the joint to open when an operator exerts a force sufficient to open the joint and to return the joint to a dosed position upon removal of the force. This joint component can have a cylinder sized to fit within a portion of a manikin limb corresponding to an unjointed portion of a human limb.

In an embodiment, a method of making a manikin comprising a stretch joint hereof comprises: (a) providing an attachment element for an elastomeric cord in a first manikin part; (b) identifying a desired pivot point on the outside of the joint interface upon which to pivot the joint to an open position; (c) providing an attachment element for a pivot pin in the first manikin part such that the distance between the pivot pin at the joint interface and the elastomeric cord at the joint interface is about 20 to 30% of the distance between the elastomeric cord at the joint interface and the pivot point; (e) providing an elastomeric cord with a strength that allows the joint to be opened by exertion of a selected force thereon and to automatically close when the force is removed; (f) stretching the elastomeric cord to about 1.25 to about 2 times its normal length; (g) attaching an end of the elastomeric cord to each of the attachment elements in the first and second manikin parts; and (h) attaching the pivot pin to the first manikin part.

A method of making a manikin joint to connect first and second parts of a manikin, wherein the first and second parts form a joint interface is also provided, the method comprising: (a) molding an attachment element for an elastomeric cord into a first manikin part; (b) identifying a desired pivot point on the outside of the joint interface upon which to pivot the joint to an open position; (c) molding an attachment element for a pivot pin into the first manikin part such that the distance between the pivot pin at the joint interface and the elastomeric cord at the joint interface is about 20 to 30% of the distance between the elastomeric cord at the joint interface and the pivot point; (d) molding an attachment tube into the second manikin part; (e) configuring an elastomeric cord to provide a strength that allows the joint to be opened by exertion of a selected force thereon and to automatically dose when the force is removed; (f) providing a tube sized to accommodate the elastomeric cord when it is stretched to a length about 1.25 to about 2 times its unstretched length; (g) providing a tubular spacer having tube walls sized to correspond to the walls of the tube used to contain the elastomeric cord; (h) positioning the spacer at an end of the tube; (i) attaching a traction element to a first end of the elastomer cord; (j) inserting the traction element into the tube at the end opposite the spacer and pushing it and the attached elastomeric cord through the tube until the traction element emerges from the end of the spacer; (k) securing the second end of the elastomeric cord to a cap; (l) affixing the cap to the end of the tube opposite the spacer; (m) stretching the elastomeric cord by causing a pulling force to be exerted on the elastomeric cord by the traction element; (n) retaining the elastomeric cord in its stretched position by means of a retaining element attached to the first end of the elastomeric cord that prevents the cord from reverting to an unstretched position inside the tube; (o) attaching the first end of the elastomeric cord to its attachment element in the first manikin part; (p) attaching the pivot pin to its attachment element in the first manikin part; and (q) attaching the tube to the attachment tube in the second manikin part.

A manikin joint is also provided comprising (a) a variable length element removably attached at one end to one manikin part and at the other end to another manikin part so as to form a joint between the parts having a joint interface between the parts; wherein: (i) the variable length element is configured to exert a pulling force on both manikin parts sufficient to keep the joint dosed with both parts touching; (ii) wherein the variable length element is capable of elongating sufficiently to cause one part to pivot on a pivot point at an edge of the joint interface thereby opening the joint when a sufficient opening force is applied to the part; and (iii) the variable length element is capable of automatically exerting a force on the parts causing the manikin parts to return to their original closed position; and (b) a pivot pin fixedly attached to one manikin part and intersecting the joint interface between the outer edge of the joint interface and the variable length element. The variable length element can be selected from the group consisting of elastomeric cords, springs, and pneumatic tubes.

Further provided herein is a method of dressing a manikin having a manikin joint in an article of clothing, the method comprising: (a) inserting a first the manikin part at least partially into the article of clothing; (b) moving the first manikin part toward the second manikin part by exerting a force on the first manikin part sufficient to open the manikin joint; (c) inserting at least a portion of a second manikin part into the article of clothing; (d) allowing the manikin joint to dose by ceasing to exert the force on the first manikin part; and (e) if necessary, finishing dressing the manikin in the article of clothing by covering remaining portions of the manikin with the article of clothing.

EXAMPLES

Example 1

Compression Spring Stretch Joint Assembly

A full-size manikin body with an integral leg, and a separate, detachable leg, were molded using polyurethane in a cold rotational molding process substantially as described in U.S. patent application Ser. No. 12/847,336 or US Patent Publication No. 20030006526, both incorporated herein by reference to the extent not inconsistent herewith for purposes of enablement and written description. The mold for the separate leg was made to comprise a void sufficient to house the portion of the second joint assembly, including the compression spring, as show in FIG. 4 that extends below the leg flangeboard. The leg mold also comprised a leg flangeboard oriented so that the guide boss would extend out of the top end of the molded leg and the concave side of the threaded screw recesses would face upward out of the top end of the molded leg so as to allow a key assembly plate to be screwed into the leg flangeboard. The leg flangeboard was integrally molded into the leg. The manikin body was also molded with a void space sufficient to receive the part of the second joint assembly extending through a key assembly plate into the body, and with the body flangeboard molded integrally into it, oriented with the screw hole recesses facing the bottom of the body so as to allow attachment of the keyway plate. The keyway plate was then attached to the body flangeboard with the locating ramps positioned to form a gap into which the pivot key fits when the flangeboards are locked together.

A small compression spring was inserted into the top of the keybody and the set screw was screwed into the top to exert a constant spring pressure of about 35 to about 50 ft. lbs. sufficient to maintain tension against a pivot key placed inside the keybody.

The bottom of a keybody was inserted through the slot in the keyway assembly plate oriented so that it would extend down inside the leg when the keyway assembly plate was screwed onto the leg flangeboard. The slot in the keybody was about 0.005 inches per side larger than the locating portion of the keybody. A retaining bushing was placed over the bottom of a large compression spring, and a spring retaining rod was inserted into the bottom of the bushing to extend upwardly into the bottom of the spring. The top of the large compression spring was inserted over the bottom of the keybody and the spring retaining rod with its integral retaining nut at the bottom was inserted into the bottom of the retaining bushing upwardly into the spring until it was received inside a threaded receiving channel in the bottom of the keybody, and screwed in.

The key assembly plate with the assembled keybody and spring was then screwed onto the leg flangeboard oriented so that spring extended down into the void in the leg. The pivot key was packaged with the manikin and the unattached leg for shipping.

The keybody had a total length of 3.375 inches, with the top section being 1.5 inches in length. The bottom section was 1.875 inches in length, and the steeply downward tapered top locating portion of the bottom section was 0.75 inches in length and tapered downwardly at an angle of 9°, while the bottom, stretch portion thereof was 1.125 inches in length and tapered downwardly at an angle of 2°. The top portion had a slot section about 0.56 inches in length accommodating a slot, and a tapered top section. The top of the keybody had a radius of 0.031 inch, tapered down outwardly from the slot section by 4° over a distance of 0.94 inches. The large compression spring was 4 inches long and after installation was compressed to 3 inches in length. It had a compression strength of 50.5 pounds and the retaining rod was 2 inches long.

Example 2

Manikin Dressing Utilizing Compression Spring Joint

Tests are perfom 1ed to assess the relative speed and ease of dressing manikins of Example 1 in long-legged trousers. 20 manikins of Example 1 having a compression spring stretch joint connecting one leg to the body are provided along with an equal number of manikins having magnetic leg joints as described in U.S. Pat. No. 6,705,794. Each individual of a team of operators dresses both sets of manikins in long-legged trousers. Each individual completes the dressing process on the manikins equipped with the compression spring leg joints hereof in about half the time it takes for that individual to complete the dressing process on the manikins equipped with the magnetic leg joints.

The operators report improved ease in the process due to the facts that the detachable leg can be easily pulled toward the other leg and does not need to be reattached, it automatically repositions itself correctly when the joint is closed. In addition, there is no worry that the joint will accidentally disengage. This is because the locating ramps on the keyway plate are structured such that the pivot key pops into a space between them, from which it will not easily dislodge during ordinary use. In addition, when the large compression spring is compressed to partially open the joint in order to dress the manikin in pants, the bottom ("stretch") portion of the keybody disengages from the slot in the assembly plate to allow some rotation without turning the pivot pin out of the location ramps. In addition, because the boss on the joint surface of the leg seats in the recess on the joint surface of body when the opening force on the large compression is removed, the pivot key automatically returns back to its original locked position every time, preventing detachment over repeated use. Further, the leg can be adjusted up and down as well as sideways. This is because the keybody portals allow the pivot key to rotate up and down within the recess in the key body beneath the small compression spring, allowing small adjustments to the position of the leg.

Example 3

Elastic Cord Stretch Joint Assembly Utilizing an Elastomeric Cord

A full-size manikin body, separate legs, and arms equipped with hands, and a separate thumb were molded using polyurethane in a cold rotational molding process substantially as described in U.S. patent application Ser. No. 12/847,336 or US Patent Publication No. 20030006526, both incorporated herein by reference to the extent not inconsistent herewith for purposes of enablement and written description. The molds for the legs and thumbs were made to comprise an attachment tube sized and shaped to receive the protective tube of an elastomeric joint hereof. The attachment tube was capped at the bottom to prevent debris from entering the tube during molding. The mold also comprised a flangeboard with a threaded body anchoring nut for attachment to the top eye bolt of the elastomeric cord, and a flangeboard with a threaded anchoring nut for receiving the threaded end of a pivot pin. The arms were attached to the shoulders of the molded body with magnetic joints substantially as described in U.S. Pat. No. 6,705,794. A ½" white nylon bungee cord with black tracer 22" long was provided and eye bolts were threaded onto it. The cord was then configured as shown in FIG. 10 by creating two loops with two crimps on each end held in place with elastomeric cord fasteners in the form of 12 gauge hog rings. The finished configuration was 8½" long.

Two attachment tubes 13-⅜" long were cut from a piece of cardboard tubing having a 1-⅜" inner diameter and a 1⅝" outer diameter. A cap designed to fit snugly onto the end of one of the attachment tubes to be molded was also provided and placed on an end of the tube. This capped attachment tube was molded into a manikin body as described above.

A protective tube was cut from cardboard tubing having a 1¼" outer diameter and a wall thickness of 0.187". A threaded bottom cap was provided to fit the tube in the form of a round threaded insert 1.25" diameter. Hex nuts with thin nylon inserts, were provided to fit the eye bolts on the bungee cord configurations. The nuts were threaded onto the eyebolts just until the thread came through the nylon. A spacer was assembled by cutting a section of rubber tubing having an outer diameter of 1¼" to a length of 2". The section of tubing was then slit lengthwise and the edges placed in abutment and taped closed with duct tape. An end of the spacer was placed in abutment with the top end of the protective tube. The bottom of the protective tube was inserted to the remaining attachment tube described above. A guide wire was attached to the top eye bolt on the elastomeric cord and used to feed the elastomeric cord into the bottom end of the cardboard protective tube and through the spacer until at least the top of an upper loop on the guide wire from the top of the protective and attachment tubes. The guide wire was attached to a traction machine, which was activated to stretch the bungee cord until the top end of the bungee cord and top eye bolt emerged from the top of the spacer. A spacer retaining bolt was inserted sideways over the top of the spacer and attachment and protective tubes through the open portion of the top eye bolt to keep the bungee cord in its stretched position. The guide wire was removed from the top eye bolt on the bungee cord and the attachment tube'.vas slid down from around the protective tube and set aside.

A hole was drilled in the manikin body wall to provide access by the threaded portion of the top eye bolt of the bungee cord to the anchoring body nut that was molded into the body. The top eye bolt, with its attached bungee cord and protective tube was screwed into the anchoring body nut.

A hole was drilled in the manikin body wall to provide access by the threaded portion of the top eye bolt of the bungee cord to the anchoring body nut that was molded into the body. The threaded portion of the top eye bolt was inserted into the hole and screwed into the anchoring body nut. The pivot pin was placed to intersect the leg-body interface at a point located at a distance away from the bungee cord that was about 20-30% of the distance between bungee cord and the pivot point.

The protective tube was then coated with urethane (PUR) adhesive and inserted into the attachment tube formed in the manikin leg, and the adhesive was allowed to dry for about 20 minutes. The spacer was then removed from the top of the protective tube by taking off the tape holding the slit rubber tubing in place, opening out the tubing and pulling it away from the bungee cord. The bungee cord was then allowed to pull the manikin joint into dosed position. The completed joint was held closed by a pull force of about 37.5 pounds.

Example 4

Thumb Elastomeric Cord Stretch Joint Assembly

The procedure described in Example 3 was followed to prepare a smaller stretch joint for a manikin thumb. The procedure was modified by using polyethylene tubing for the protective and attachment tubes surrounding a single strand of ¼" bungee cord, and scaling down the pull force exerted by the elastomeric cord to between about 2 and about 4 pounds in the closed joint.

Example 5

Completion of the Manikins

Completion of the manikins of Example 4 involved attaching arms to the body via magnetic joints and by attaching thumbs to the hands by assembling thumb stretch joints as described in Example 4. The arms were dressed in gloves by operating the joints to move the thumbs in toward the fingers.

Example 6

Manikin Dressing Using Manikins with Elastomeric Cord Stretch Joints

Tests were perfor125med to assess the relative speed and ease of dressing manikins of Example 3 in long-legged trousers. Seventeen manikins of Example 3 having a stretch joint connecting one leg to the body were provided along with an equal number of manikins having magnetic leg joints as described in U.S. Pat. No. 6,705,794. Each individual of a team of operators dressed both sets of manikins in long-legged trousers. Each individual completed the dressing process on the manikins equipped with the elastomeric leg joints hereof in about half the time it took for that individual to complete the dressing process on the manikins equipped with the magnetic leg joints. The operators reported improved ease in the process due to the fact that less strength was required to pull the stretch joints open and that there was less danger of pinching the fingers when the joint closed.

It will be appreciated by those of ordinary skill in the art that the components, method steps and materials illustrated above may be varied by substitution of equivalent components, steps and materials capable of performing the same functions. It will also be appreciated by one of ordinary skill in the art that sizes and strengths of the components can be scaled up or down as required for specific purposes. The claims hereof are intended to encompass all such equivalent components, method steps and scales.

What is claimed is:

1. A method of using a manikin joint, comprising:
   providing a first manikin part, the first manikin part comprising a first joint assembly including:
      a first flangeboard including a recess and a groove; and
      a keyway;
   providing a second manikin part, the second manikin part comprising a second joint assembly including:
      a stretch element having a length sufficient to allow partial opening of a joint from about 20° to about 60°;
      a keybody, the keybody shaped to engage the keyway, the keybody having an engagement orientation and a locking orientation and being operationally connected to the stretch element;
      a pivot key disposed through and in rotational engagement with the keybody; and
      a second flangeboard including a guide boss, the guide boss shaped to engage the recess; and
   attaching the second manikin part to the first manikin part to form a manikin joint by:
      positioning the second manikin part with respect to the first manikin part such that a surface of the first joint assembly and a surface of the second joint assembly are substantially parallel, the guide boss is proximate to the end of the groove farthest away from the recess, and the keybody is in the engagement orientation with respect to the keyway;
      moving at least one of the first manikin part and the second manikin part toward the other such that the guide boss is received within the groove and a top portion of the keybody and the pivot key are received through the keyway;
      rotating at least one of the first manikin part and the second manikin part with respect to the other until the guide boss reaches the end of the groove closest to the recess and the pivot key is in the locking orientation with respect to the keyway, thereby locking the second joint assembly to the first joint assembly;
      exerting a force in a medial direction on the second manikin part to disengage the guide boss from the groove; and
      rotating the second manikin part with respect to the first manikin part in the same direction as the first rotating step until the guide boss mates with the recess and the stretch element causes the manikin parts to be pulled together.

2. The method of claim 1, further comprising:
   after the attaching step, exerting a force in a medial direction on the second manikin part to apply a stretching force on the stretching element;
   wherein the stretching force applied to the stretching element allows the keybody to rotate on the pivot key; and
   wherein the second manikin part rotates on a pivot point with respect to the first manikin part.

3. The method of claim 1, wherein the first manikin part is a manikin body with an integral leg and the second manikin part is a detachable manikin leg.

4. The method of claim 3, further comprising:
   inserting a lower end of the integral leg through a first leg of a pair of pants;
   exerting a force in a medial direction on the detachable manikin leg to cause the detachable manikin leg to pivot on a pivot point with respect to the body;
   inserting a lower end of the detachable leg through a second leg of the pair of pants;
   pulling the pants in a superior direction to cover the legs; and
   releasing the force exerted on the detachable leg.

5. The method of claim 1, further comprising detaching the second manikin part from the first manikin part by performing the following steps:
   exerting a force in a medial direction on the second manikin part to apply a stretching force on the stretching element and raise the guide boss out of the recess;
   rotating the second manikin part with respect to the first manikin part to align the guide boss with the groove;
   removing the force on the second manikin part to allow the stretching element to pull the guide boss into the groove;
   rotating the second manikin part until the guide boss reaches the end of the groove farthest from the recess and the pivot key enters the engagement orientation with respect to the keyway;
   pulling the second manikin part away from the first manikin part such that the keybody and pivot key exit the keyway.

* * * * *